US012703107B2

(12) United States Patent
Wu et al.

(10) Patent No.: US 12,703,107 B2
(45) Date of Patent: Aug. 11, 2026

(54) COMPOUND FORK DEVICE AND SYSTEM INCLUDING THE SAME

(71) Applicant: TAIWAN SEMICONDUCTOR MANUFACTURING COMPANY, LTD., Hsinchu (TW)

(72) Inventors: Cheng-Lung Wu, Hsinchu (TW); Chih-Hung Huang, Hsinchu (TW); Yang-Ann Chu, Hsinchu (TW); Jiun-Rong Pai, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 1248 days.

(21) Appl. No.: 17/574,725

(22) Filed: Jan. 13, 2022

(65) Prior Publication Data

US 2023/0016251 A1 Jan. 19, 2023

Related U.S. Application Data

(60) Provisional application No. 63/221,996, filed on Jul. 15, 2021.

(51) Int. Cl.

| | |
|---|---|
| ***B25J 15/00*** | (2006.01) |
| ***B25J 15/04*** | (2006.01) |
| *B25J 11/00* | (2006.01) |

(52) U.S. Cl.

CPC ........... *B25J 15/0014* (2013.01); *B25J 15/04* (2013.01); *B25J 11/0095* (2013.01)

(58) Field of Classification Search

None

See application file for complete search history.

(56) References Cited

U.S. PATENT DOCUMENTS

| | | | | |
|---|---|---|---|---|
| 9,362,152 | B2 * | 6/2016 | Wada | B66C 13/18 |
| 9,685,361 | B2 * | 6/2017 | Yoshioka | H01L 21/67775 |
| 10,081,494 | B2 * | 9/2018 | Yoshioka | B65G 35/00 |
| 2013/0051966 | A1 | 2/2013 | Kim et al. | |

(Continued)

FOREIGN PATENT DOCUMENTS

| | | | |
|---|---|---|---|
| CN | 1371851 | A | 10/2002 |
| CN | 111994584 | A | 11/2020 |

(Continued)

OTHER PUBLICATIONS

Taiwanese Search Report for Taiwanese Application No. 111112283, dated Jan. 5, 2023, with English translation.

(Continued)

*Primary Examiner* — Mark C Hageman

(74) *Attorney, Agent, or Firm* — Birch, Stewart, Kolasch & Birch, LLP

(57) ABSTRACT

A compound fork device includes a first prong and a second prong spaced apart from the first prong. Each of the first and second prongs has an upper surface and a lower surface which is depressed relative to the upper surface. The upper surfaces of the first and second prongs are configured to cooperatively retain a first type container. The lower surfaces of the first and second prongs are configured to cooperatively retain a second type container having a configuration different from that of the first type container. A method and a system using the compound fork device are also disclosed.

20 Claims, 19 Drawing Sheets

(56) References Cited

U.S. PATENT DOCUMENTS

| | | | |
|---|---|---|---|
| 2015/0255318 | A1 | 9/2015 | Wada et al. |
| 2018/0305125 | A1 | 10/2018 | Guo et al. |
| 2019/0176339 | A1 | 6/2019 | Ko et al. |
| 2020/0126833 | A1 | 4/2020 | Rebstock |
| 2020/0161161 | A1 | 5/2020 | Wu et al. |
| 2021/0098275 | A1 | 4/2021 | Li et al. |

FOREIGN PATENT DOCUMENTS

| | | | |
|---|---|---|---|
| JP | 2015-168531 | A | 9/2015 |
| JP | 2015-171919 | A | 10/2015 |
| KR | 10-2015-0106360 | A | 9/2015 |
| KR | 10-2016-0082177 | A | 7/2016 |
| KR | 10-2031805 | B1 | 10/2019 |

OTHER PUBLICATIONS

Japanese Office Action for Japanese Application No. 2022-107695, dated Jun. 27, 2023, with English translation.
Korean Notice of Allowance for Korean Application No. 10-2022-0065305, dated Aug. 6, 2024, with English translation.
Chinese Office Action and Search Report for Chinese Application No. 202210322456.4, dated Mar. 6, 2025, with English translation.
Korean Office Action for Korean Application No. 10-2022-0065305, dated Nov. 29, 2023, with English translation.
German Office Action for German Application No. 102022109022.1, dated Apr. 28, 2026, with English translation.

* cited by examiner

COMPOUND FORK DEVICE AND SYSTEM INCLUDING THE SAME

REFERENCE TO RELATED APPLICATION

This application claims priority of U.S. Provisional Application No. 63/221,996 filed on Jul. 15, 2021, the contents of which is incorporated herein by reference in its entirety.

BACKGROUND

The semiconductor integrated circuit (IC) industry has over the decades experienced tremendous advancements and is still undergoing vigorous development. With dramatic advances in technology, the manufacturing of ICs is oftentimes machine-driven, which increases work safety, productivity, and efficiency. However, as complexity of the IC manufacturing process increases such that various materials and devices are frequently involved, process efficiency may drop and production costs may surge. Thus, the industry pays much attention on development of machines that are more adept in handling versatile tasks.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
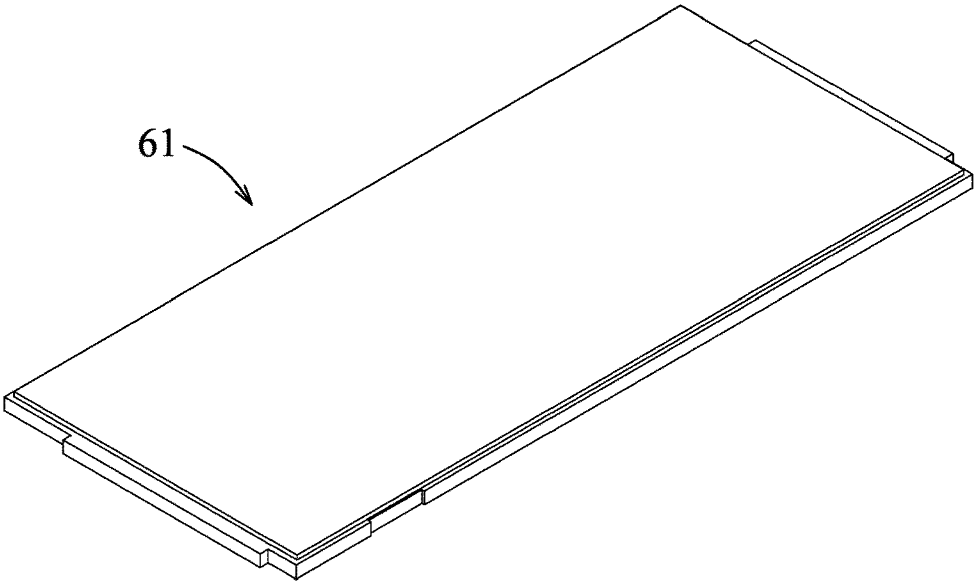
FIG. 1A is an exemplary perspective view illustrating a container in accordance with some embodiments.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “on,” “above,” “over,” “below,” “upper,” “lower,” “top,” “bottom,” “front,” “rear,” “outwardly,” “forwardly,” “rearwardly,” “inner,” “outer,” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In a semiconductor manufacturing process, a container that carries at least one semiconductor device, such as a chip or a die, is transported to and from various processing ports manually or more commonly, by various automated carrier devices or an automated material handling system (AMHS) to ensure efficiency and safety. The automated material handling system may be, but not limited to, a system that includes at least one of a rail guided vehicle (RGV), an overhead shuttle (OHS), an overhead hoist transport (OHT), an automatic guided vehicle (AGV), a personal guided vehicle (PGV), or a rail and vehicle, or other suitable devices. The carrier devices may be, but not limited to, a mobile robot programmed for a transporting process or a robotic arm.

Figure 1B:
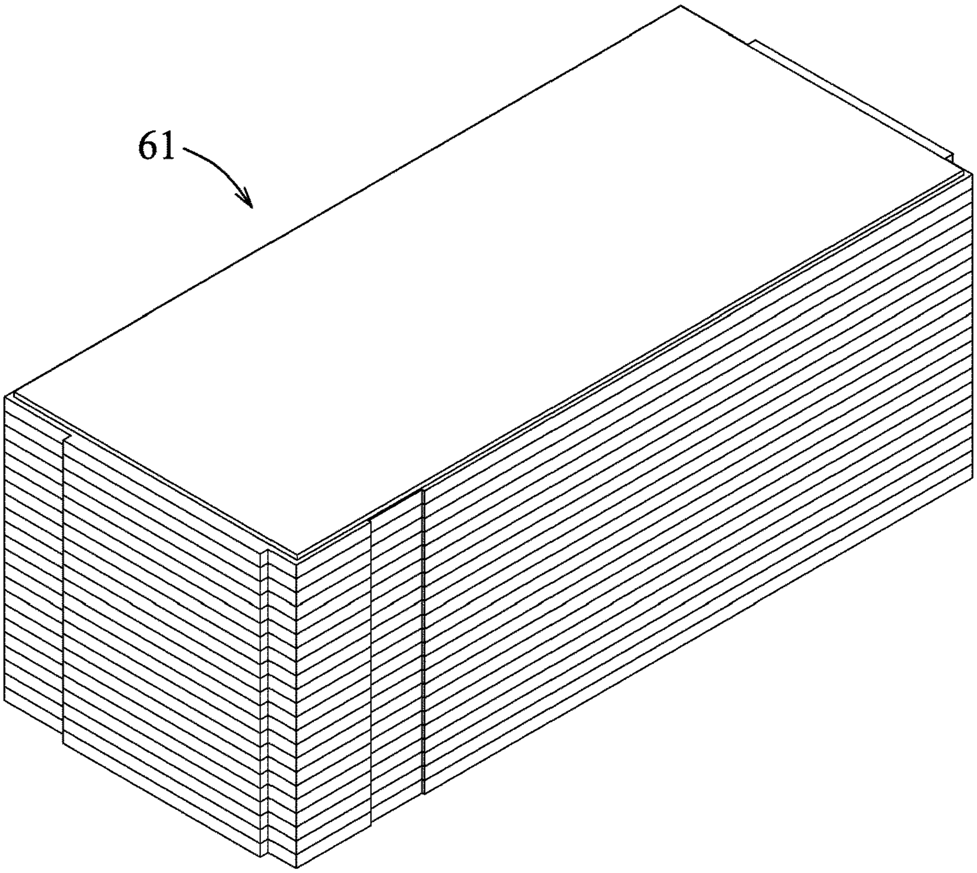
FIG. 1B is an exemplary perspective view of a container including a stack of the containers shown in FIG. 1A in accordance with some embodiments.

FIG. 1A is an exemplary perspective view illustrating a container 61 in accordance with some embodiments. The container 61 is mainly used for, but not limited to, carrying at least one finished semiconductor product, such as a DRAM or other suitable products, and is typically referred to as a tray. FIG. 1B illustrates a container (which is a stack of the containers 61 shown in FIG. 1A and also denoted by reference numeral 61) in accordance with some embodiments. In order to hold or transport the container 61 shown in FIG. 1A or 1B, two supporting arms of a robot (not shown) may be employed to lift and retain the container 61, thereby permitting the robot to transport the container 61 to a predetermined location.

Figure 2:
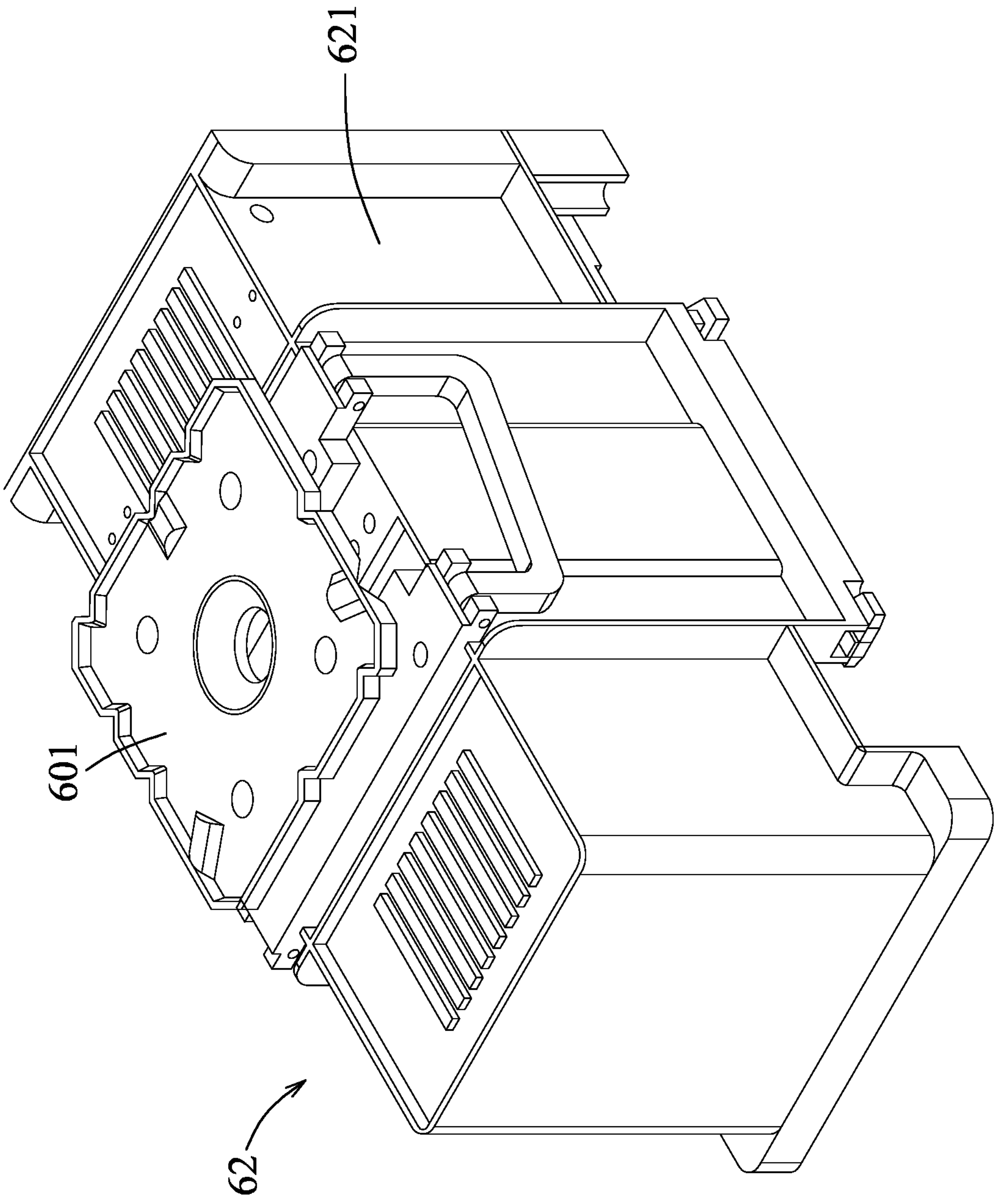
FIG. 2 is an exemplary perspective view illustrating another container in accordance with some embodiments.

FIG. 2 is an exemplary perspective view illustrating another container 62 in accordance with some embodiments. The container 62 is mainly used for, but not limited to, carrying the container 61 shown in FIG. 1A or 1B, and is typically referred to as a tray cassette type container. The container 62 may include a container body 621 configured to permit the container 61 shown in FIG. 1A or 1B to be accommodated therein, and a top flange 601 mounted on a top surface of the container body 621. The top flange 601 is configured to permit the container 62 to be gripped and transported to, for example, but not limited to, an overhead hoist transport (OHT) of the AMHS. In order to hold or transport the container 62, a robot configured with a gripper hand (not shown) may be employed to clutch or grip the top flange 601 of the container 62, thereby allowing the robot to transport the container 62 to a predetermined location.

Figure 3A:
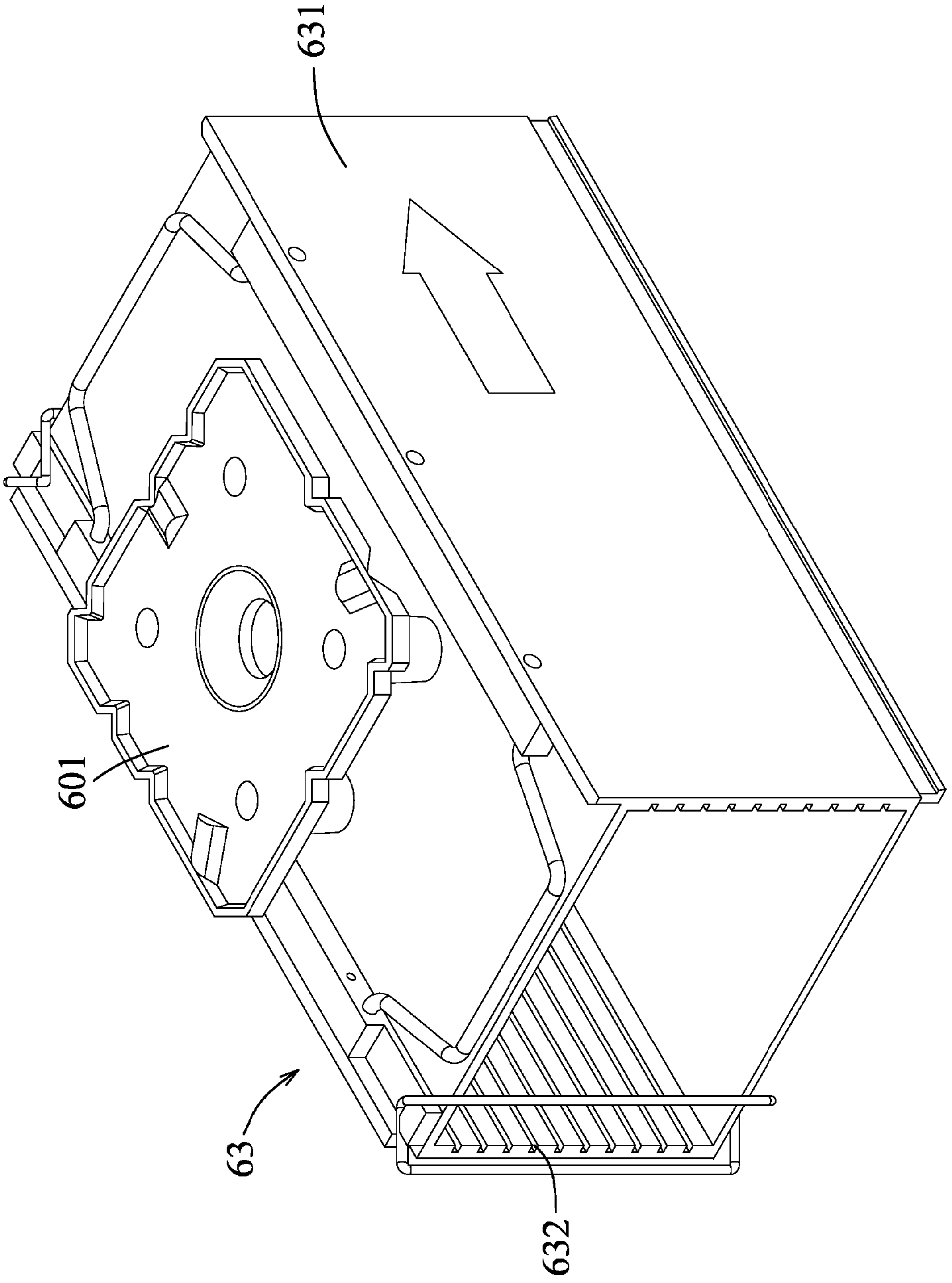
FIG. 3A is an exemplary perspective view illustrating a yet another container in accordance with some embodiments.
Figure 3B:
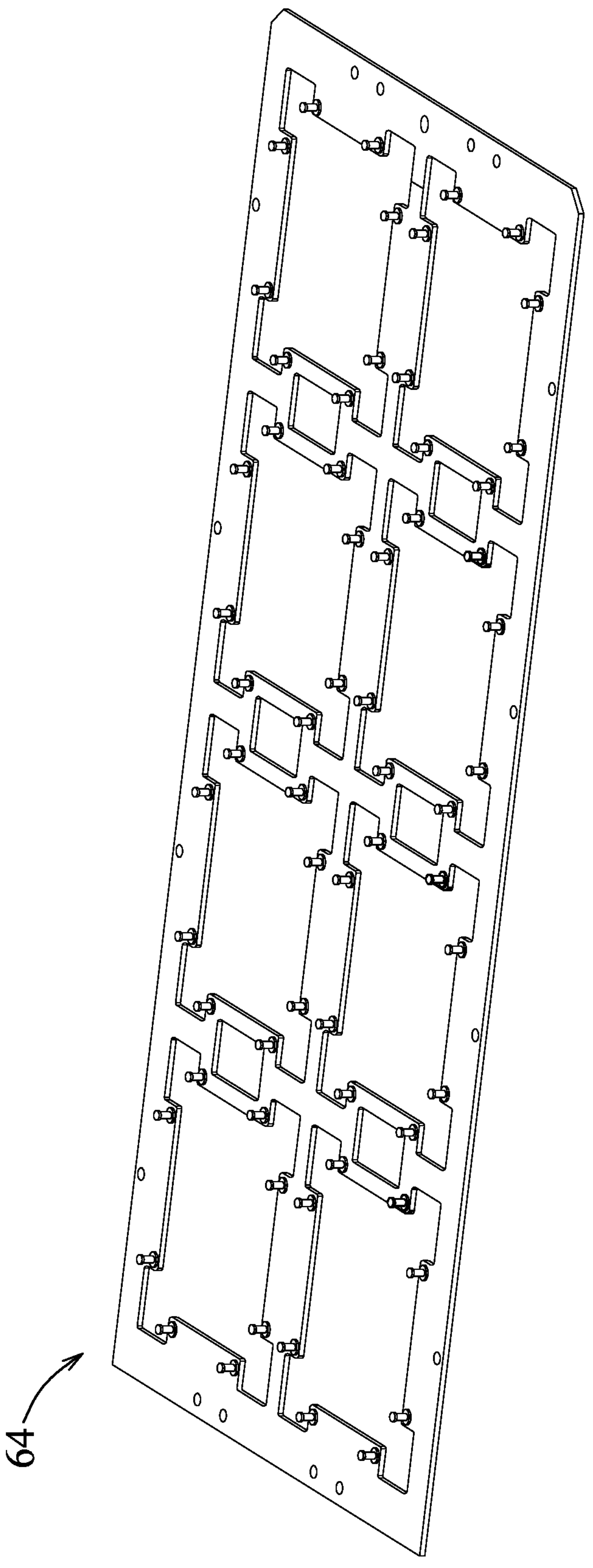
FIG. 3B is an exemplary perspective view of a vessel in accordance with some embodiments.

FIG. 3A is an exemplary perspective view illustrating a yet another container 63 in accordance with some embodiments. FIG. 3B is an exemplary perspective view of a vessel 64 in accordance with some embodiments. The container 63 is different from the container 62 shown in FIG. 2 in that the container 63 is mainly used for, but not limited to, carrying the vessel(s) 64, which is typically referred to as boat(s). The vessel 64 is configured for retaining thereon a plurality of semiconductor devices (not shown) that await to be further processed. The container 63 may include a container body 631 and a top flange 601 which is formed on a top surface of the container body 631 and which has a configuration similar to the top flange 601 of the container 62 but may have a different thickness from that of the top flange 601 of the container 62. The container body 631 may have a plurality of guiding slots 632 at two opposite inner walls thereof so as to guide insertion and removal of the vessel(s) 64 from the container body 631, and so as to prevent the vessels 64 inside the container body 631 from being in contact with each other. The container 63 is typically referred to as a magazine type container. In order to hold or transport the container 63, a robot configured with two guide rails (not shown) is employed to permit two opposite sides of the top flange 601 of the container 63 to slide on and to be retained between the guide rails, thereby allowing the robot to transport the container 63 to a predetermined location.

Therefore, in order to hold or transport different types of containers (such as the containers 61, 62, 63), carrier devices with corresponding interfaces are utilized, which not only complicates the semiconductor manufacturing process, but incurs additional costs, such as maintenance costs, and efficiency of the semiconductor manufacturing process may be adversely affected.

To improve efficiency of integrated circuit (IC) manufacturing process, the present disclosure provides a compound fork device which does not need to change its interface when holding or transporting different types of the abovementioned containers.

Figure 4:
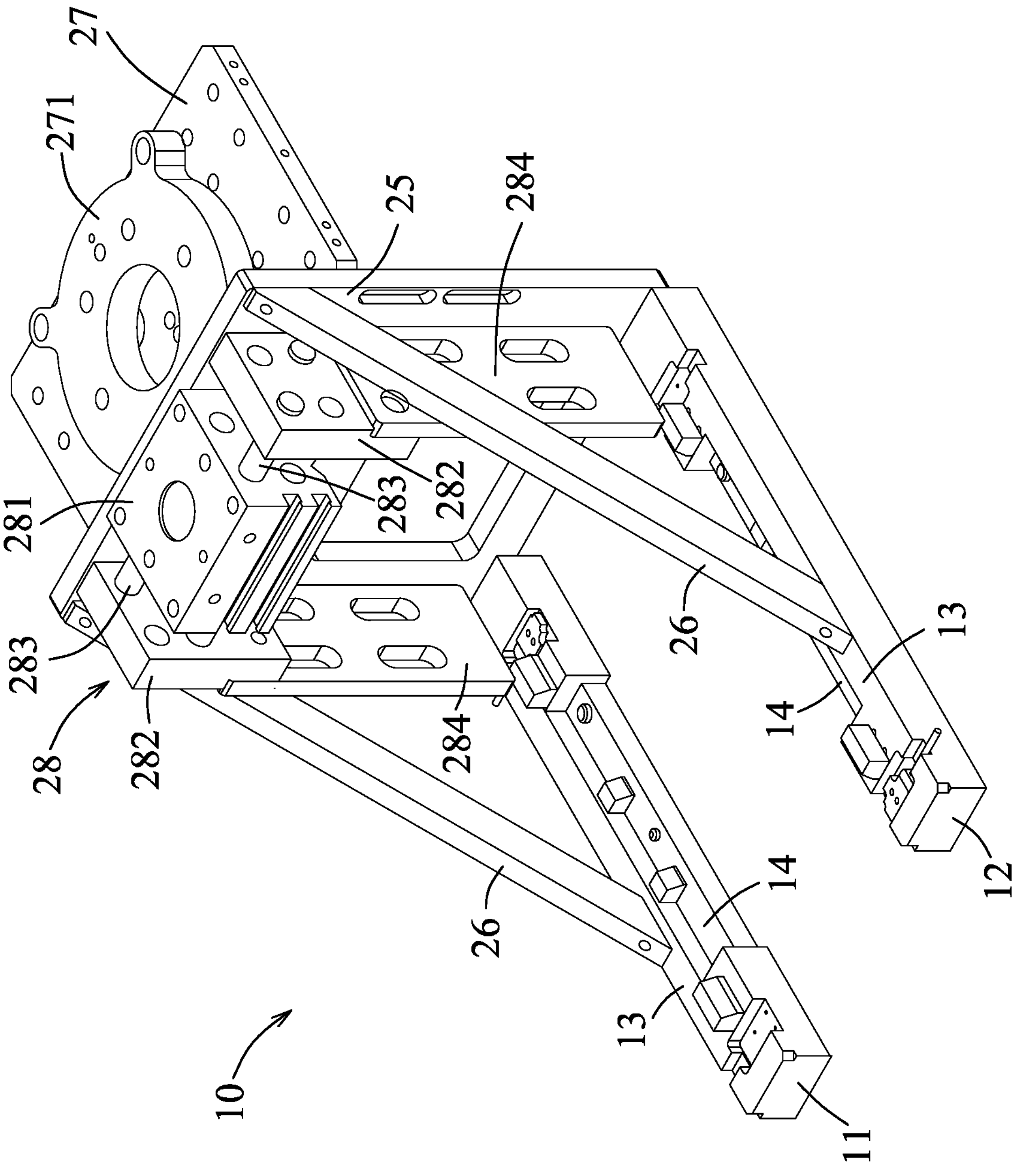
FIG. 4 is an exemplary perspective view illustrating a compound fork device in accordance with some embodiments.
Figure 5:
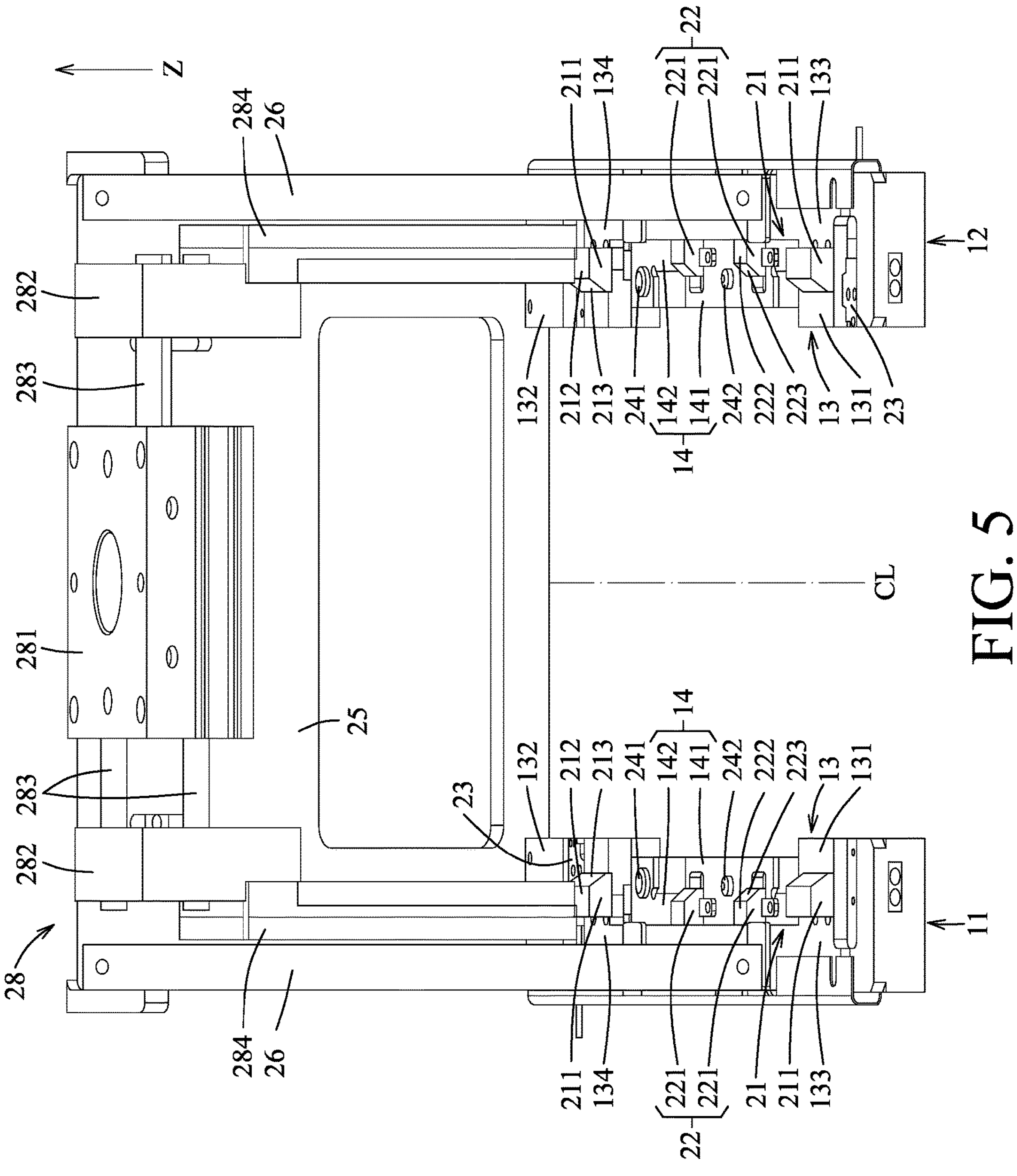
FIG. 5 is a fragmentary perspective front view of the compound fork device in accordance with some embodiments.
Figure 6:
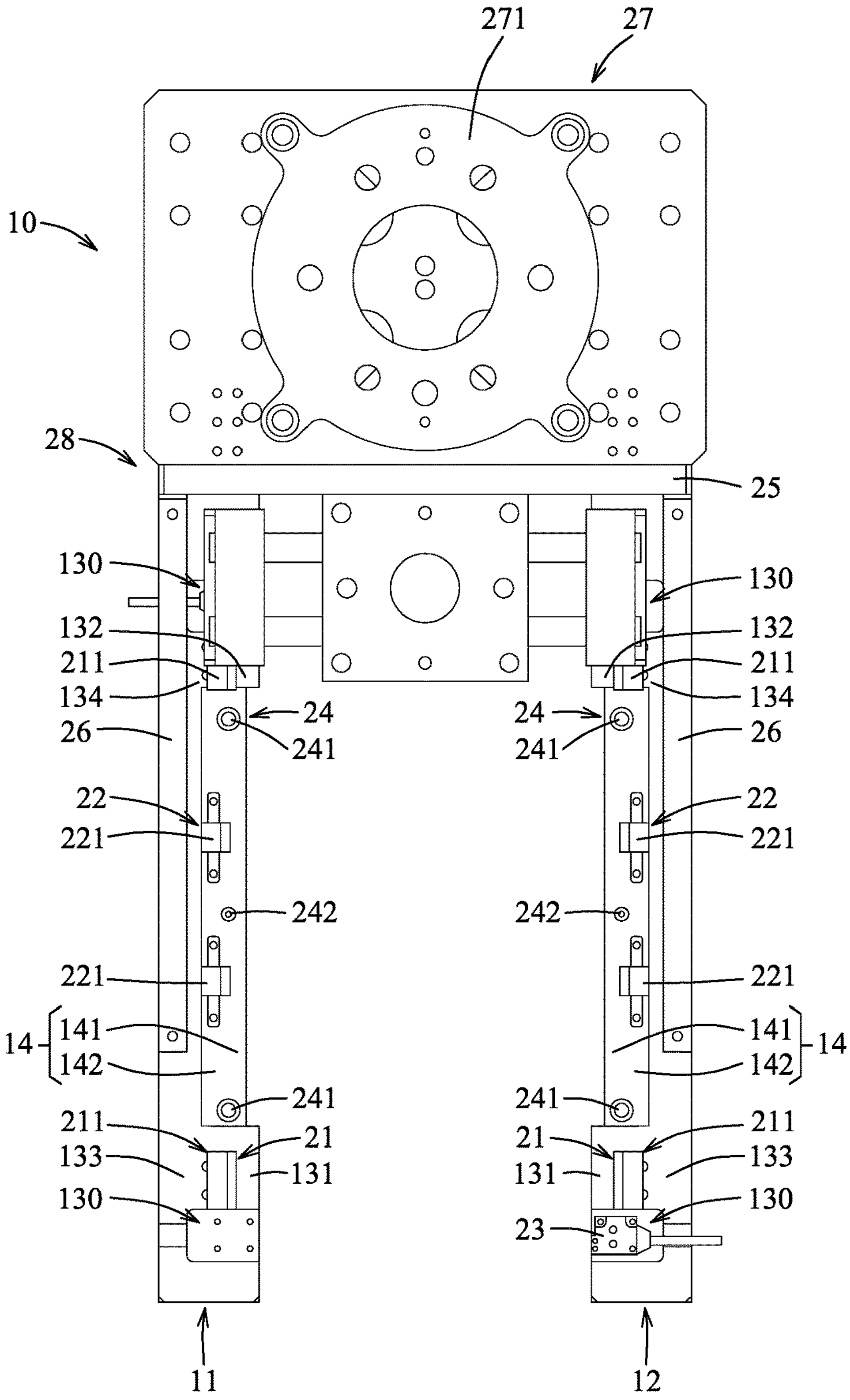
FIG. 6 is a top view of the compound fork device in accordance with some embodiments.

FIG. 4 illustrates an exemplary perspective view of a compound fork device 10 in accordance with some embodiments. FIG. 5 is a fragmentary perspective front view of the compound fork device 10 in accordance with some embodiments. FIG. 6 is a top view of the compound fork device 10 in accordance with some embodiments.

The compound fork device 10 includes a first prong 11 and a second prong 12 that is spaced apart from the first prong 11. The compound fork device 10 may be applied on, but not limited to, a robot 50 (shown in FIGS. 15 and 17), such as a 6-axis robot, a mobile robot, or the like. Other suitable machines or robots for applying the compound fork device 10 thereon are within the contemplated scope of the disclosure. Each of the first and second prongs 11, 12 may extend in a direction away from a machine or a robot to which the compound fork device 10 is connected. In some other embodiments, the first and second prongs 11, 12 are spaced apart from each other at a fixed distance, and may extend parallel to each other. In certain embodiments, the first and second prongs 11, 12 may be spaced apart from each other at a distance that ranges from about 90 mm to about 140 mm. In some embodiments, the first and second prongs 11, 12 may be made from metal, such as aluminum, or the like. In certain embodiments, the metal may be anodized to increase durability of the first and second prongs 11, 12. Other suitable materials for the first and second prongs 11, 12 are within the contemplated scope of the disclosure. Each of the first and second prongs 11, 12 has an upper surface 13 and a lower surface 14 that is depressed relative to the upper surface 13.

Figure 7:
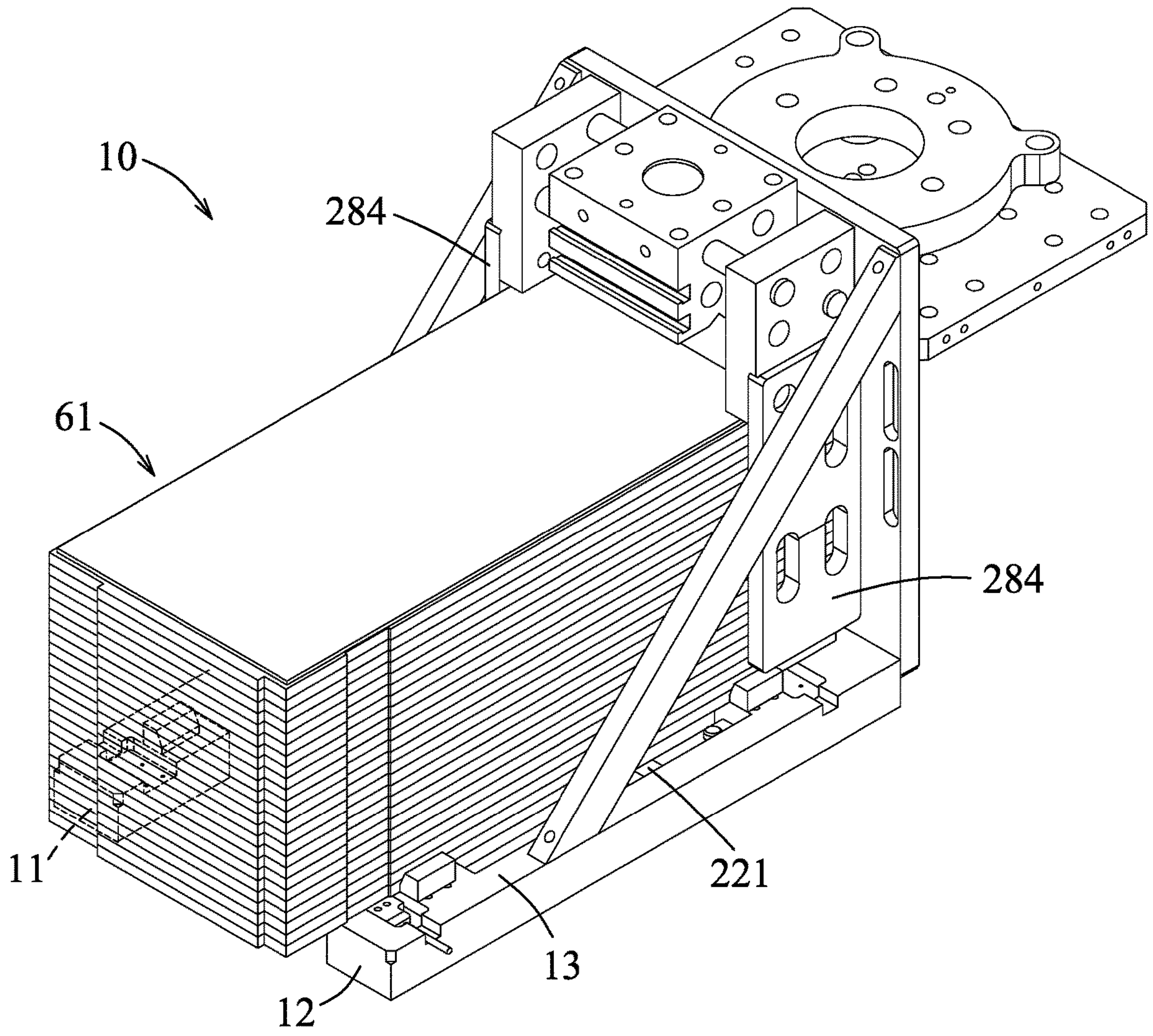
FIG. 7 is an exemplary perspective view illustrating the container shown in FIG. 1B being retained by the compound fork device in accordance with some embodiments.
Figure 8A:
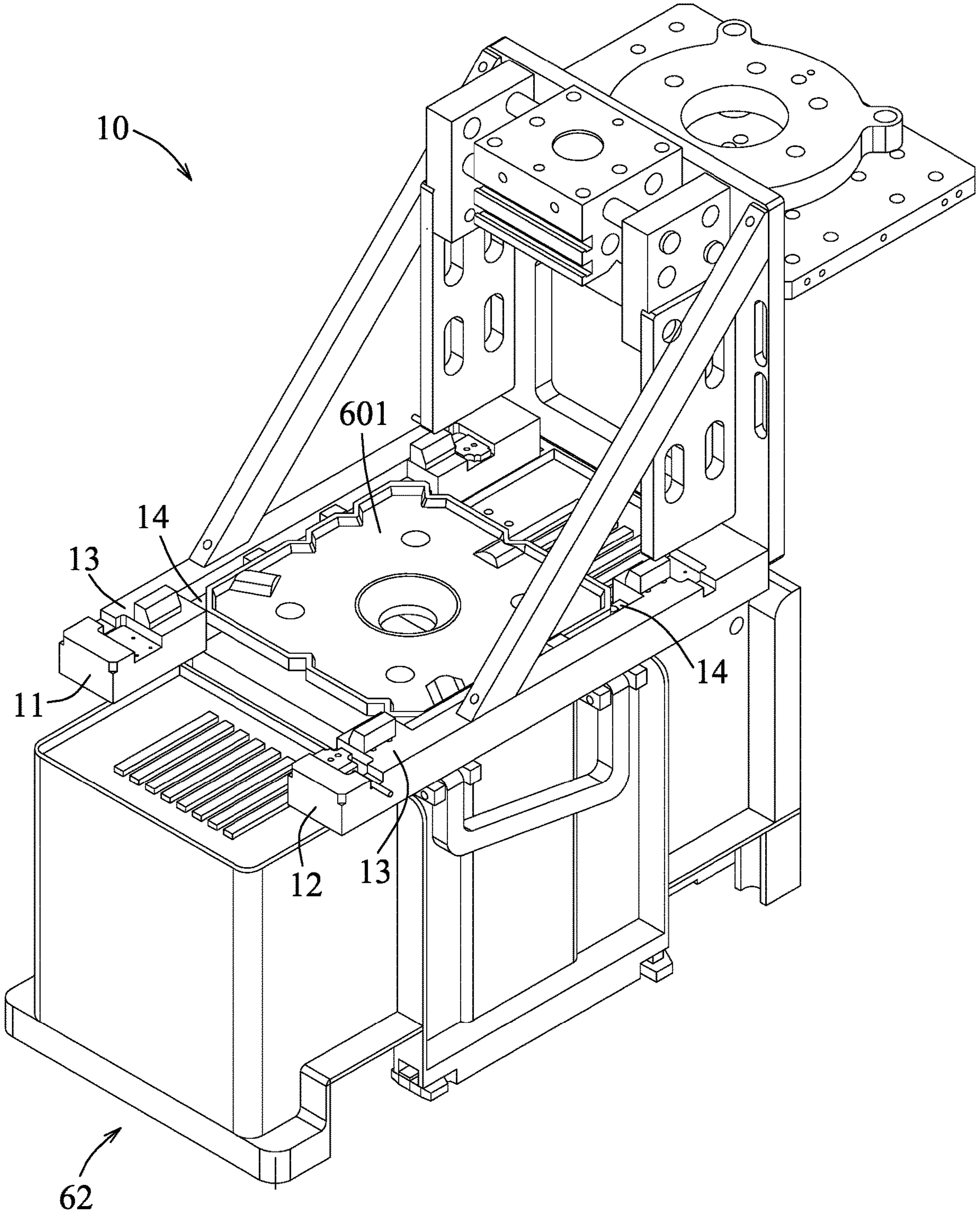
FIG. 8A is an exemplary perspective view illustrating the container shown in FIG. 2 being retained by the compound fork device in accordance with some embodiments.
Figure 8B:
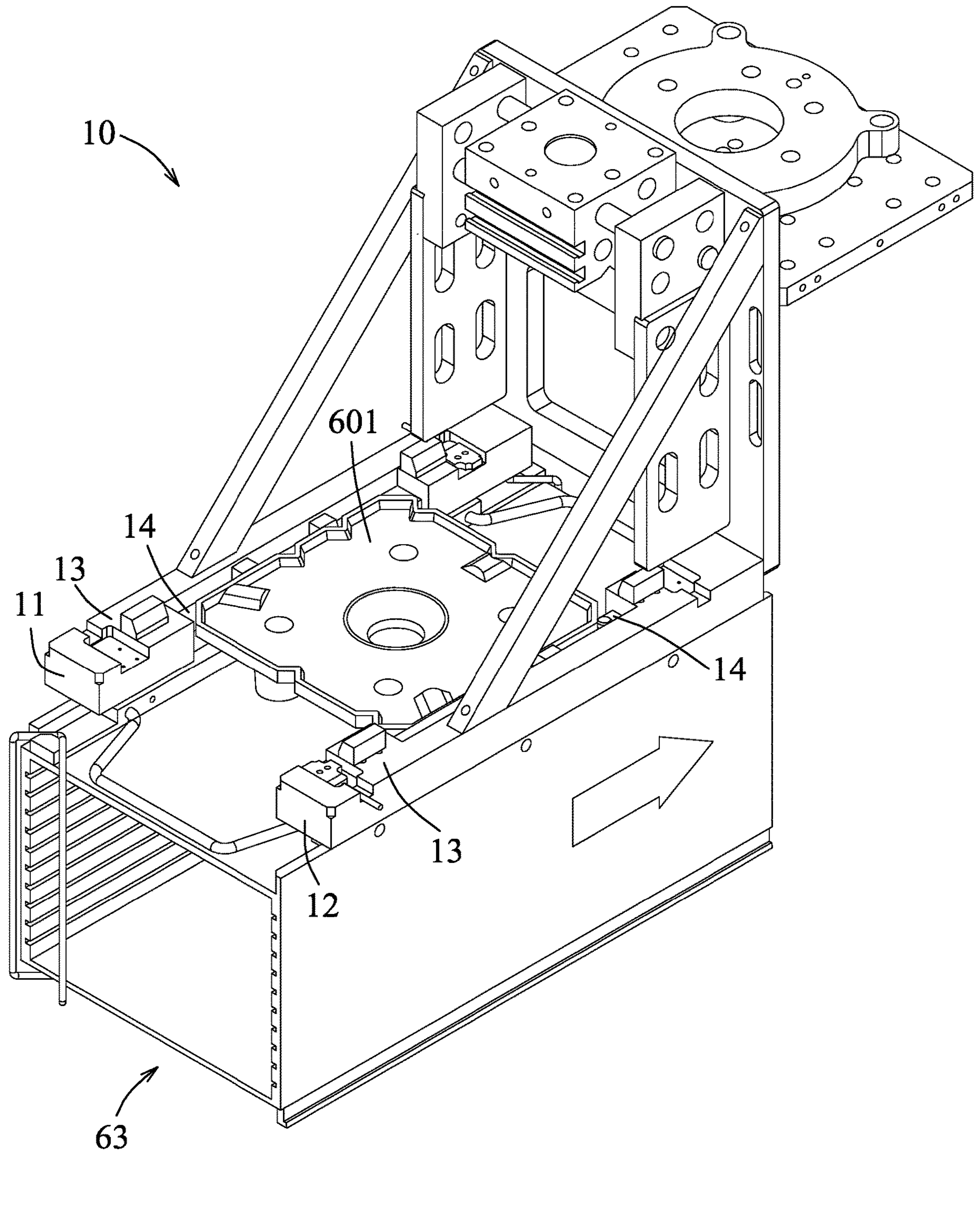
FIG. 8B is an exemplary perspective view illustrating the container shown in FIG. 3A being retained by the compound fork device in accordance with some embodiments.

FIG. 7 is an exemplary perspective view illustrating the container 61 shown in FIG. 1B being retained by the compound fork device 10 in accordance with some embodiments. FIG. 8A is an exemplary perspective view illustrating the container 62 being retained by the compound fork device 10 in accordance with some embodiments. FIG. 8B is an exemplary perspective view illustrating the container 63 being retained by the compound fork device 10 in accordance with some embodiments. The upper surfaces 13 of the first and second prongs 11, 12 are configured to cooperatively retain a first type container (for example, the container 61 shown in FIGS. 1A, 1B, and 7, or other suitable containers without top flanges). The lower surfaces 14 of the first and second prongs 11, 12 are configured to cooperatively retain a second type container (for example, the container 62 shown in FIGS. 2 and 8A, the container 63 shown in FIGS. 3A and 8B, or other suitable containers with the top flanges 601). The second type container 62, 63 has a configuration different from that of the first type container 61. In some embodiments, the first and second prongs 11, 12 may be symmetrical to each other with respect to a central line (CL, shown in FIG. 5) between the first and second prongs 11, 12.

Figure 9:
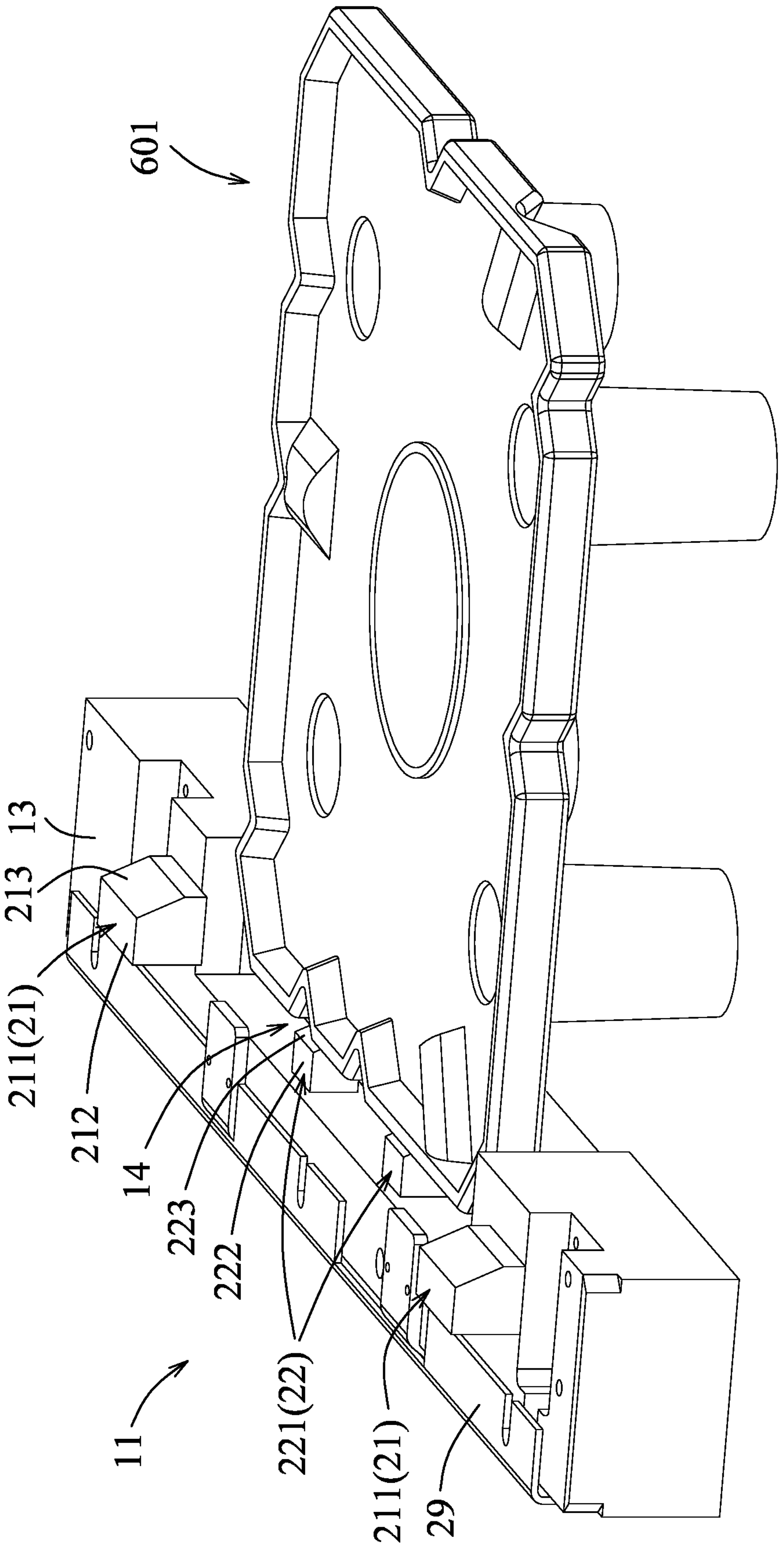
FIG. 9 is a fragmentary perspective top view illustrating a top flange being retained by a first prong of the compound fork device in accordance with some embodiments.
Figure 10:
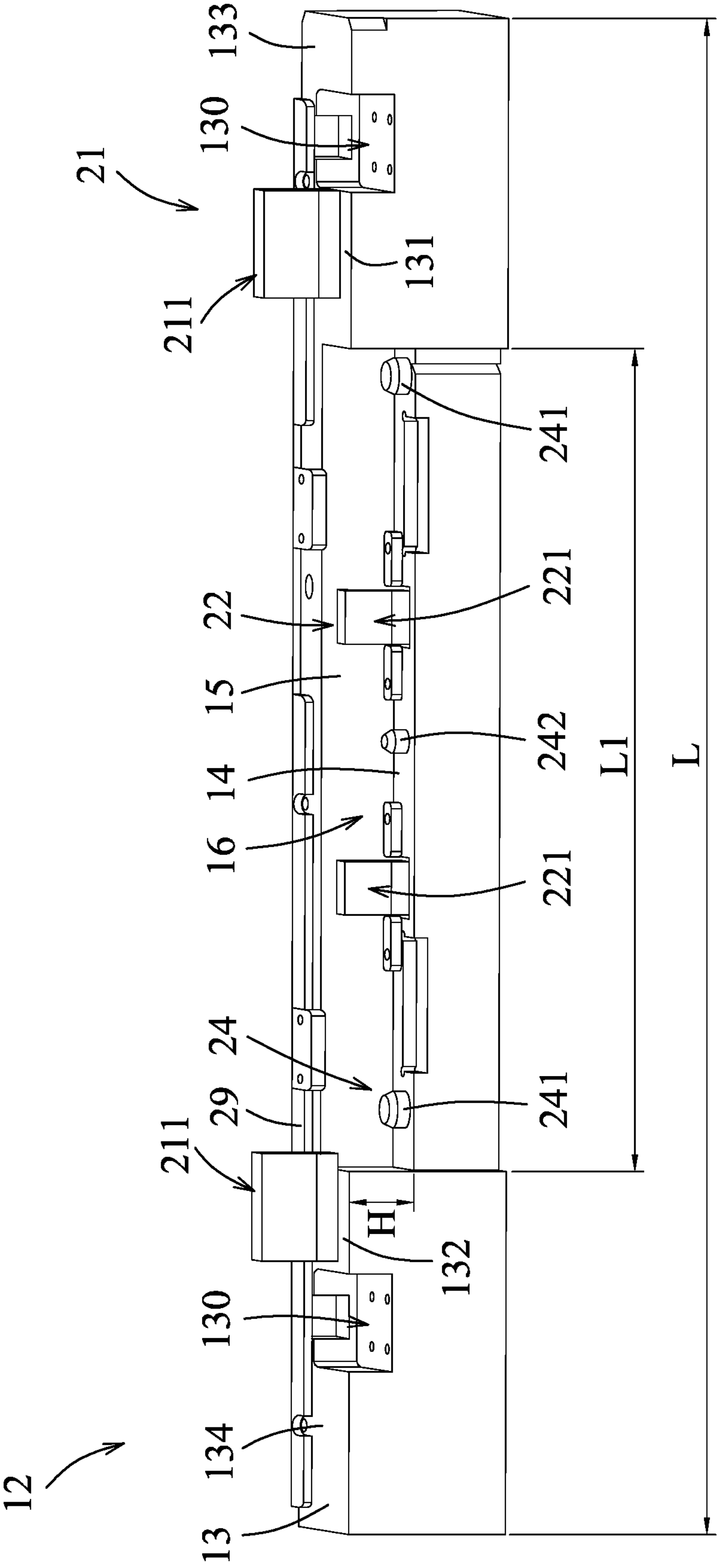
FIG. 10 is an exemplary perspective side view illustrating a second prong of the compound fork device in accordance with some embodiments.

FIG. 9 is a fragmentary perspective top view illustrating the top flange 601 being retained by the first prong 11 in accordance with some embodiments. FIG. 10 is an exemplary perspective side view illustrating the second prong 12 in accordance with some embodiments. In some embodiments, a height difference (H) between the upper surface 13 and the lower surface 14 of each of the first and second prongs 11, 12 may be in a range from about 1 mm to about 5 cm so that the top flange 601 of the second type container 62, 63 can be retained on the lower surface 14 and below the upper surface 13 (as shown in FIGS. 8A, 8B, and 9). In certain embodiments, the height difference (H) is greater than a thickness of the top flange 601. In some embodiments, a length (L) of each of the first and second prongs 11, 12 may be substantially the same as a length of the first type container 61. In alternative embodiments, the length (L) may be smaller than or greater than the length of the first type container 61 as long as the first type container 61 can be retained by the upper surfaces 13 of the first and second prongs 11, 12. In some embodiments, in consideration of a torque acting on, for example, the robot 50 shown in FIGS. 15 and 17, which affects the stability of the compound fork device 10 for holding and transporting containers, the length (L) of each of the first and second prongs 11, 12 is not greater than about 110% of the length of the first type container 61. The lower surface 14 and a side wall 15 that connects between the upper surface 13 and the lower surface 14 form a depressed region 16. In some embodiments, a length (L1) of the depressed region 16 is greater than a length of the top flange 601 (see FIGS. 9 and 10). In some embodiments, the length (L1) of the depressed region 16 is about 40% to about 60% of the length (L) of each of the first and second prongs 11, 12 so that the top flange 601 of the second type container 62, 63 can be retained within the depressed region 16. In some embodiments, the lower surface 14 may be recessed to reduce the weight of the compound fork device 10.

Figure 11:
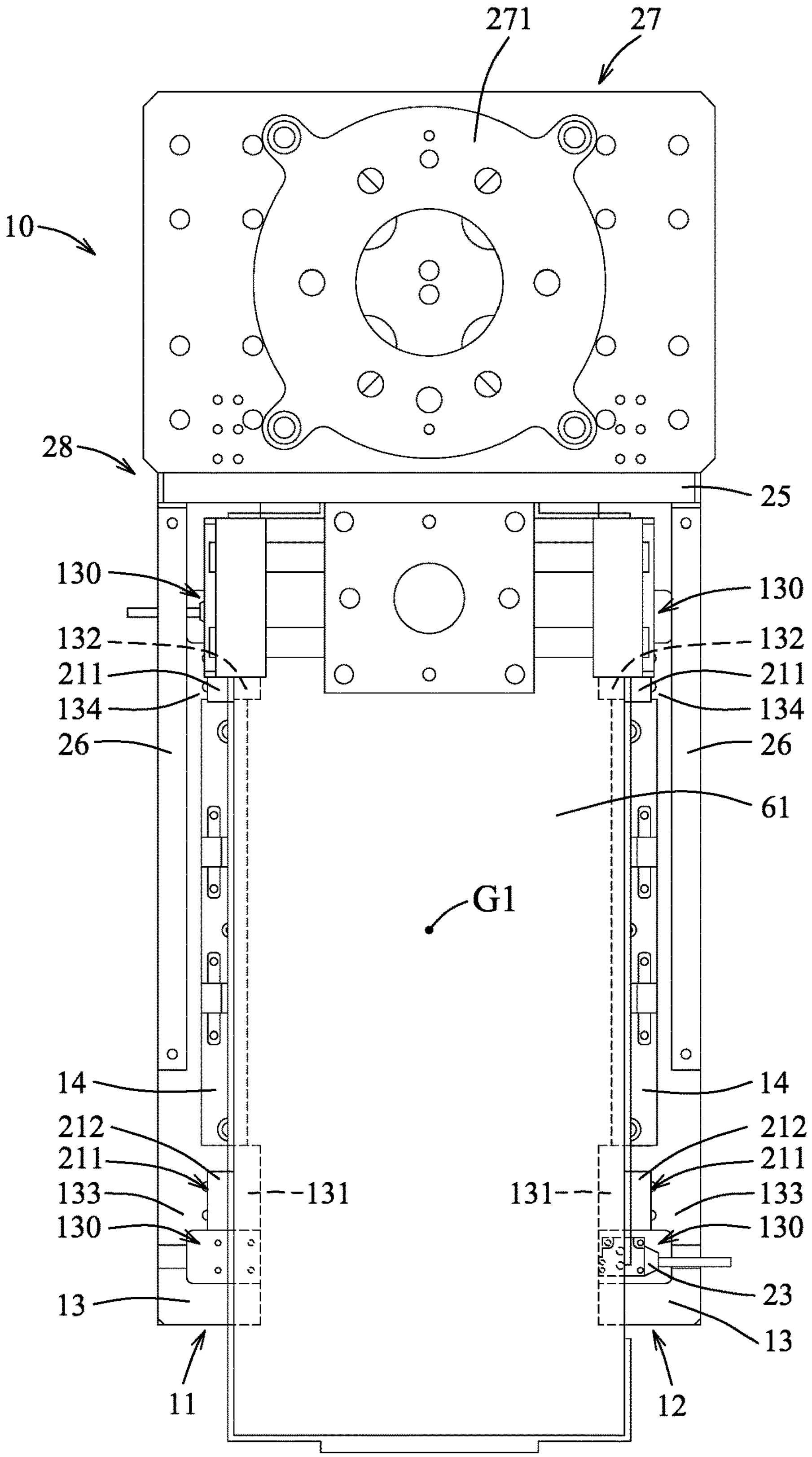
FIG. 11 is an exemplary top view of FIG. 7.

FIG. 11 is an exemplary top view illustrating the first type container 61 being retained by the compound fork device 10 in accordance with some embodiments. As shown in FIGS. 5, 6, 10 and 11, in some embodiments, the upper surface 13 of each of the first and second prongs 11, 12 includes a front supporting region 131 and a rear supporting region 132 located rearwardly of the front supporting region 131. In some embodiments, the front supporting region 131 is located forwardly of the lower surface 14 (i.e., the depressed region 16), and the rear supporting region 132 is located rearwardly of the lower surface 14 (i.e., the depressed region 16) so as to permit four portions of the first type container 61 to be respectively retained by the front and rear supporting regions 131, 132 of the upper surfaces 13 of the first and second prongs 11, 12. The four portions of the first type container 61 may be, but not limited to, four edge portions of the first type container 61. In some embodiments, the upper surface 13 of each of the first and second prongs 11, 12 has a front mounting region 133 located outwardly of the front supporting region 131, and a rear mounting region 134 located outwardly of the rear supporting region 132. In certain embodiments, a reinforcing piece 29 (shown in FIGS. 9 and 10) may be mounted to partially cover at least one of the front mounting regions 133 and the rear mounting regions 134 of the upper surfaces 13 of the first and second prongs 11, 12 so as to mechanically strengthen the first prong 11 and/or the second prong 12.

In some embodiments, as shown in FIGS. 5 and 10, two upper guiding units 21 are respectively formed on the upper surfaces 13 of the first and second prongs 11, 12 to guide two sides of the first type container 61 so as to permit the four portions of the first type container 61 to be respectively moved onto the front and rear supporting regions 131, 132 of the upper surfaces 13 of the first and second prongs 11, 12. In some embodiments, as shown in FIG. 5, the upper guiding units 21 disposed respectively on the first and second prongs 11, 12 may be symmetrical to each other with respect to the central line (CL). In some embodiments, each of the upper guiding units 21 includes at least two upper guide blocks 211 which are respectively disposed on the front and rear mounting regions 133, 134 of a respective one of the first and second prongs 11, 12. In alternative embodiments, each of the upper guiding units 21 may include more than two upper guide blocks 211.

In some embodiments, as shown in FIGS. 5 and 11, the compound fork device 10 of the present disclosure may further include at least two sensors 23. The sensors 23 are used for inspecting and ensuring placement of the first type container 61 on the compound fork device 10. With the sensors 23 provided on the compound fork device 10, the first type container 61 can be prevented from being tilted or wrongly positioned when being retained by the compound fork device 10. In some embodiments, one of the sensors 23 is disposed forwardly of the upper guide blocks 211 of one of the upper guiding units 21, and the other one of the sensors 23 is disposed rearwardly of the upper guide blocks 211 of the other one of the upper guiding units 21. In some embodiments, the sensors 23 may be placed in, but not limited to, recesses 130 (see FIGS. 10 and 11) formed in the first and second prongs 11, 12 so as to prevent the sensors 23 from being in contact with the first type container 61. In alternative embodiments, two sensors 23 are disposed on each of the first and second prongs 11, 12, to be located respectively forwardly and rearwardly of the upper guide blocks 211 of a respective one of the upper guiding units 21. Each of the sensors 23 may be independently a pressure sensor, a proximity sensor, an infrared sensor, a light sensor, an ultrasonic sensor, a fiber sensor, or the like, or combinations thereof. Other suitable sensors are within the contemplated scope of the disclosure.

In some embodiments, the sensors 23 are light sensors or infrared sensors, and emit waves to sense if an object (i.e., container) is within a predetermined position/distance. The sensors 23 may include a plastic material. In some embodiments, the sensors 23 are set to trigger a response for the compound fork device 10 to operate when the container 61 is within a distance of about 1 mm to each of the sensors 23.

Figure 12:
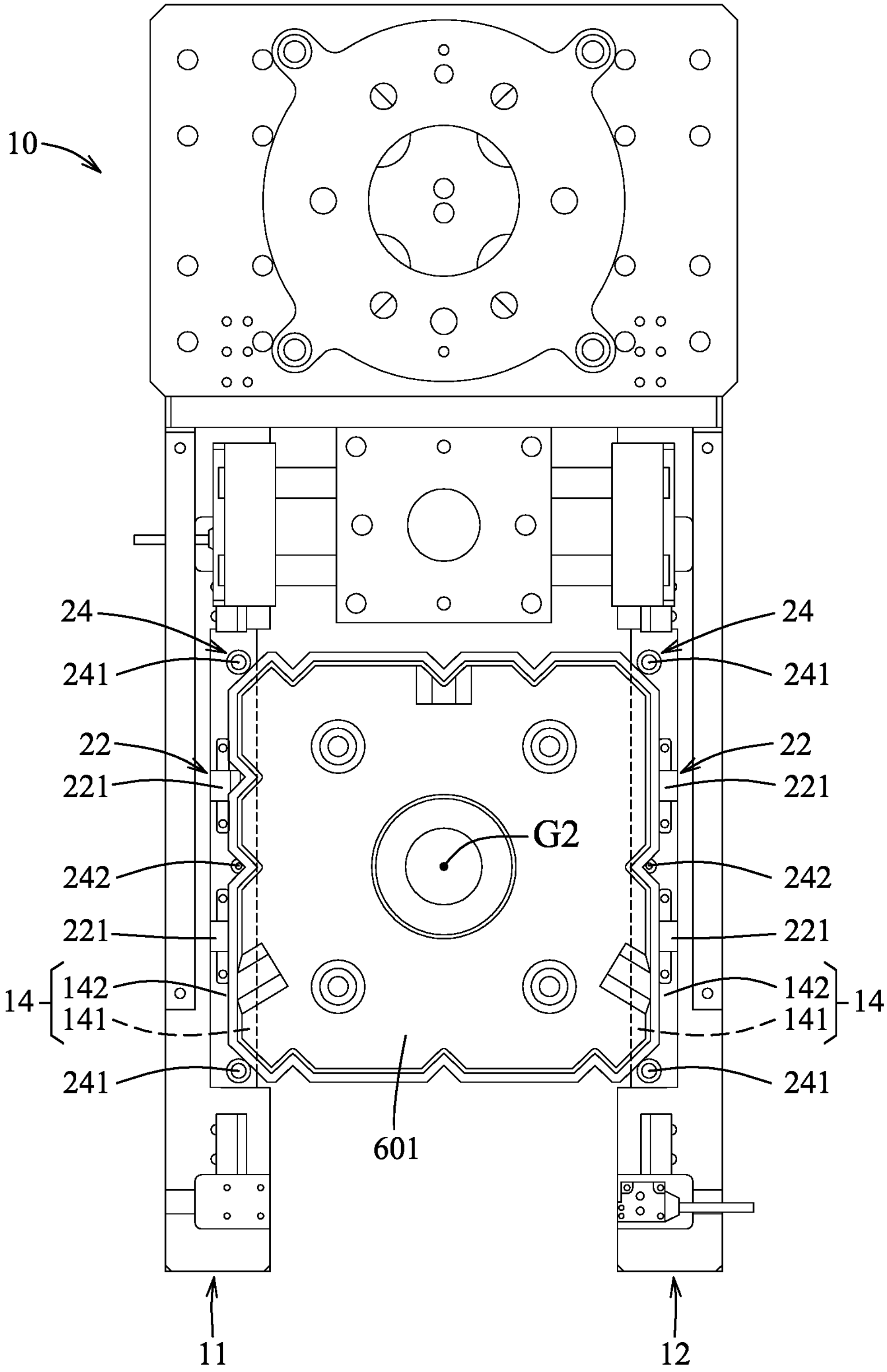
FIG. 12 is an exemplary top view illustrating the top flange being retained by the compound fork device in accordance with some embodiments.

FIG. 12 is an exemplary top view illustrating the top flange 601 being retained by the compound fork device 10 in accordance with some embodiments.

As shown in FIGS. 5 and 12, in some embodiments, the lower surface 14 of each of the first and second prongs 11, 12 has an inner supporting region 141 and an outer mounting region 142 located outwardly of the inner supporting region 141. The inner supporting regions 141 of the first and second prongs 11, 12 are located to cooperatively retain the top flange 601 of the second type container 62, 63. In some embodiments, two lower guiding units 22 are respectively formed on the outer mounting regions 142 of the first and second prongs 11, 12 so as to guide two sides of the top flange 601 of the second type container 62, 63 (see also FIGS. 8A and 8B) to respectively move onto the inner supporting regions 141 of the first and second prongs 11, 12. In some embodiments, as shown in FIG. 5, the lower guiding units 22 disposed respectively on the first and second prongs 11, 12 may be symmetrical to each other with respect to the central line (CL). In some embodiments, each of the lower guiding units 22 includes at least two lower guide blocks 221 which are spaced apart from each other and which are disposed on the outer mounting region 142 of a respective one of the first and second prongs 11, 12. In alternative embodiments, each of the lower guiding units 22 may include more than two lower guide blocks 221. In some embodiments, the lower guide blocks 221 and a respective one of the first and second prongs 11, 12 are integrally formed. In alternative embodiments, the lower guide blocks 221 may be partly and respectively inserted into recesses (not shown) of the lower surface 14 of a respective one of the first and second prongs 11, 12. In some embodiments, as shown in FIGS. 9 and 10, each of the lower guide blocks 221 is disposed offset from a midpoint of the length (L1) of the depressed region 16 on a respective one of the first and second prongs 11, 12, or disposed to prevent from engaging with a midpoint of a corresponding side of the top flange 601.

Figure 13:
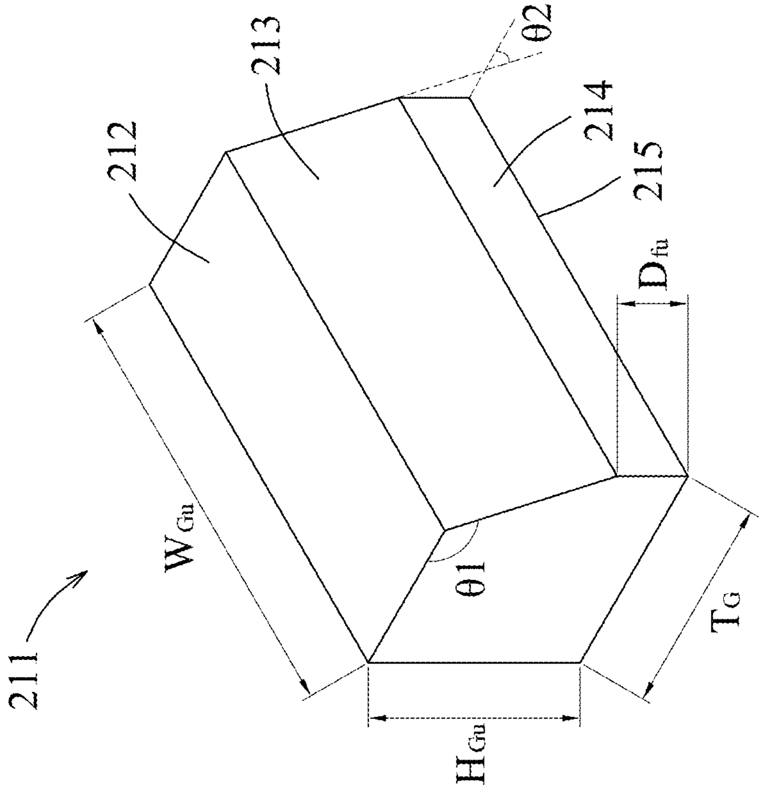
FIG. 13 illustrates an exemplary perspective view of one of upper guide blocks of the compound fork device in accordance with some embodiments.
Figure 14:
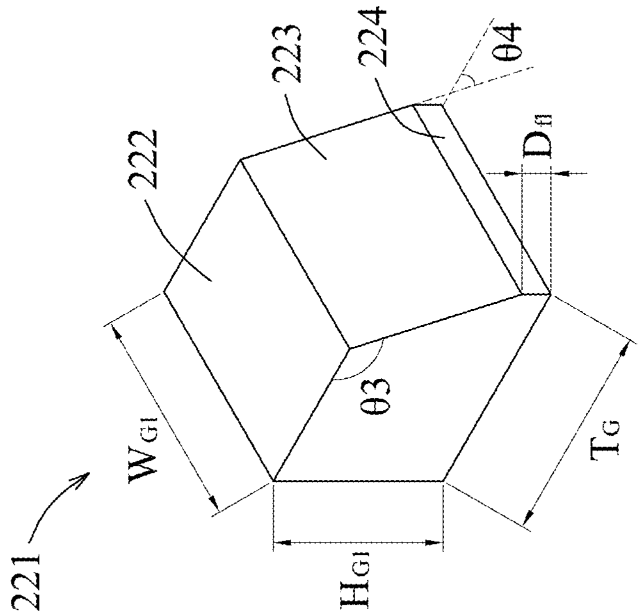
FIG. 14 illustrates an exemplary perspective view of one of lower guide blocks of the compound fork device in accordance with some embodiments.

FIG. 13 illustrates an exemplary perspective view of one of the upper guide blocks 211 in accordance with some embodiments. FIG. 14 illustrates an exemplary perspective view of one of the lower guide blocks 221 in accordance with some embodiments.

As shown in FIGS. 5, 6, and 13, in some embodiments, each of the two upper guide blocks 211 has a first top surface 212, a bottom surface 215, and an upper guiding surface 213. The upper guiding surfaces 213 of the upper guide blocks 211 of one of the upper guiding units 21 are disposed to confront the upper guiding surfaces 213 of the upper guide blocks 211 of the other one of the upper guiding units 21. The upper guiding surface 213 may extend inclinedly and downwardly from the first top surface 212. In some embodiments, at least about two-thirds of the bottom surface 215 of each of the upper guide blocks 211 is in contact with the upper surface 13 of a respective one of the first and second prongs 11, 12. In some embodiments, an included angle (θ1) between the first top surface 212 and the upper guiding surface 213 may range from about 90° to about 135°. In some embodiments, an included angle (θ2) between the upper guiding surface 213 and the upper surface 13 of a corresponding one of the first and second prongs 11, 12 may be not less than about 45° and less than about 90°. By arranging the included angle (θ2) (and optionally the included angle (θ1)) in the aforesaid range, the first type container 61 can be smoothly guided by the upper guide blocks 211. When the included angle (θ2) is less than about 45°, the first type container 61 may not be guided by the upper guide blocks 211 to move onto the front and rear supporting regions 131, 132. When the included angle (θ2) is not less than about 90°, the first type container 61 may not be guided by the upper guide blocks 211, and may directly fall onto the front and rear supporting regions 131, 132, which may damage contained products (for example, semiconductor devices) inside the first type container 61. In some embodiments, each of the upper guide blocks 211 further has an upper flat surface 214 extending downwardly from the upper guiding surface 213 to the upper surface 13 of a corresponding one of the first and second prongs 11, 12 such that the upper flat surface 214 is arranged substantially perpendicular to the upper surface 13 of the corresponding one of the first and second prongs 11, 12. The upper flat surface 214 is configured so that, when the first type container 61 is retained, the first type container 61 is not tilted and is settled evenly on the front supporting regions 131 and the rear supporting regions 132 of the upper surfaces 13 of the first and second prongs 11, 12. In some embodiments, each of the upper guide blocks 211 has a block height ($H_{Gu}$) in a direction normal to the corresponding upper surface 13, and a flat surface dimension ($D_{fu}$) (i.e., a dimension of the upper flat surface 214 in the direction normal to the corresponding upper surface 13). The flat surface dimension ($D_{fu}$) is not less than about 1 mm and is not greater than about a half of the block height ($H_{Gu}$). In some embodiments, the upper guide blocks 211 may be made from metal, such as aluminum, or the like. The metal may be anodized to increase durability. Other suitable materials for the upper guide blocks 211 are within the contemplated scope of the disclosure.

As shown in FIGS. 5 and 14, each of the lower guide blocks 221 has a second top surface 222 and a lower guiding surface 223. The lower guiding surfaces 223 of the lower guide blocks 221 of one of the lower guiding units 22 are disposed to confront the lower guiding surfaces 223 of the lower guide blocks 221 of the other one of the lower guiding units 22. The lower guiding surface 223 may extend inclinedly and downwardly from the second top surface 222. In some embodiments, an included angle (θ3) between the second top surface 222 and the lower guiding surface 223 may range from about 90° to about 135° and may be the same as or different from the included angle (θ1) of each of the upper guide blocks 211 shown in FIG. 13. In some embodiments, an included angle (θ4) between the lower guiding surface 223 and the lower surface 14 of a corresponding one of the first and second prongs 11, 12 may be not less than about 45° and less than about 90°, and may be the same as or different from the included angle (θ2) of each of the upper guide blocks 211 shown in FIG. 13. By arranging the included angle (θ4) (and optionally the included angle (θ3)) in the aforesaid range, the second type container 62, 63 can be smoothly guided by the lower guide blocks 221. When the included angle (θ4) is less than about 45°, the second type container 62, 63 may not be guided by the lower guide blocks 221 to move onto the inner supporting regions 141 of the first and second prongs 11, 12. When the included angle (θ4) is not less than about 90°, the first type container 62, 63 may not be guided by the lower guide blocks 221, and may directly fall onto the inner supporting regions 141, which may damage contained products (for example, semiconductor devices) inside the second type container 62, 63. In some embodiments, each of the lower guide blocks 221 further has a lower flat surface 224 extending downwardly from the lower guiding surface 223 to the lower surface 14 of a corresponding one of the first and second prongs 11, 12 such that the lower flat surface 224 is arranged substantially perpendicular to the lower surface 14 of the corresponding one of the first and second prongs 11, 12. The lower flat surface 224 is configured so that when the second type container 62, 63 is retained, the top flange 601 of the second type container 62, 63 is not tilted and is settled evenly on the inner supporting region 141 of the lower surface 14. In some embodiments, each of the lower guide blocks 221 has a block height (HO in a direction normal to the corresponding lower surface 14, and a flat surface dimension ($D_{fl}$) (i.e., a dimension of the lower flat surface 224 in the direction normal to the corresponding lower surface 14). The block height ($H_{Gl}$) is not greater than the height difference (H) between the upper surface 13 and the lower surface 14 of each of the first and second prongs 11, 12 so that the lower guide blocks 221 are prevented from being in contact with the first type container 61 (see also FIGS. 7 and 10). The flat surface dimension ($D_{fl}$) is not less than about 1 mm and is not greater than about a half of the block height ($H_{Gl}$). In some embodiments, the lower guide blocks 221 may be made from metal, such as aluminum, or the like. The metal may be anodized to increase durability. Other suitable materials for the lower guide blocks 221 are within the contemplated scope of the disclosure.

In some embodiments, sensors (not shown) may be provided to detect whether the top flange 601 is settled evenly on the inner supporting region 141 of the lower surface 14 or not. Each of the sensors may be independently a pressure sensor, a proximity sensor, an infrared sensor, a light sensor, an ultrasonic sensor, a fiber sensor, or the like, or combinations thereof. Other suitable sensors are within the contemplated scope of the disclosure.

As shown in FIGS. 13 and 14, in some embodiments, a thickness ($T_G$) of each of the upper and lower guide blocks 211, 221 may range from about 5 mm to about 15 mm, and the thickness ($T_G$) of each of the upper guide blocks 211 may be the same as or different from the thickness ($T_G$) of each of the lower guide blocks 221. In some embodiments, a width ($W_{Gu}$) of each of the upper guide blocks 211 may range from about 15 mm to about 30 mm. In some embodiments, a width (WO of each of the lower guide blocks 221 is not greater than the width ($W_{Gu}$) of each of the upper guide blocks 211. In some other embodiments, the width ($W_{Gl}$) of each of the lower guide blocks 221 may be about 30% to about 70% of the width ($W_{Gu}$) of each of the upper guide blocks 211.

As shown in FIGS. 5, 10, and 12, in some embodiments, two positioning units 24 are respectively mounted on the lower surfaces 14 of the first and second prongs 11, 12. The two positioning units 24 are configured to position the top flange 601 when being retained by the lower surfaces 14 of the first and second prongs 11, 12. In some embodiments, each of the positioning units 24 includes two main positioning pins 241, one of which is located forwardly of the lower guide blocks 221 of a respective one of the lower guiding units 22, and the other of which is located rearwardly of the lower guide blocks 221 of the respective one of the lower guiding units 22, such that when the two sides of the top flange 601 are respectively moved onto the inner supporting regions 141 of the first and second prongs 11, 12, each of the two sides of the top flange 601 can be respectively positioned between the two main positioning pins 241 of a respective one of the positioning units 24. The main positioning pins 241 of the positioning units 24 may be respectively located outwardly of the four edges of the top flange 601, thereby positioning the top flange 601. In some embodiments, the four edges of the top flange 601 are beveled edges. When the top flange 601 is retained between the first and second prongs 11, 12, the main positioning pins 241 may be brought into abutting engagement with the beveled edges, respectively. The main positioning pins 241 may be cylindrically shaped, but are not limited thereto. The main positioning pins 241 may be made from metal, such as aluminum, or the like. The metal may be anodized to increase durability of the main positioning pins 241. Other suitable materials and/or configurations for the main positioning pins 241 are within the contemplated scope of the disclosure.

In some embodiments, each of the positioning units 24 may further include an auxiliary positioning pin 242 which is located between the two main positioning pins 241 and between the lower guide blocks 221 of a respective one of the lower guiding units 22, and which is configured to engage with a respective one of the two sides of the top flange 601 when the two sides of the top flange 601 are respectively moved onto the inner supporting regions 141 of the first and second prongs 11, 12. The auxiliary positioning pin 242 may be cylindrically shaped, but are not limited thereto. The auxiliary positioning pin 242 may be made from metal, such as aluminum, or the like. The metal may be anodized to increase durability of the auxiliary positioning pin 242. Other suitable materials and/or configurations for the auxiliary positioning pin 242 are within the contemplated scope of the disclosure. In some embodiments, the auxiliary positioning pin 242 has a size smaller than that of the main positioning pins 241. In some embodiments, each of the main positioning pins 241 and the auxiliary positioning pin 242 has a height relative to the lower surface 14 that is not greater than a thickness of the top flange 601 so that each of the main positioning pins 241 and the auxiliary positioning pin 242 is prevented from being in contact with the first type container 61 shown in FIG. 7.

In some embodiments, as shown in FIG. 5, the upper surface 13 and the lower surface 14 are cooperatively configured so that the center of gravity of the top flange 601 (G2, see FIG. 12) coincides with the center of gravity of the first type container 61 (G1, see FIG. 11) along an axis in a Z direction. The Z direction extends normal to both the upper and lower surfaces 13, 14 of each of the first and second prongs 11, 12.

In some embodiments, as shown in FIGS. 4 and 5, the compound fork device 10 may further include a rear frame 25. A rear end of each of the first and second prongs 11, 12 is mounted to the rear frame 25. In some embodiments, the rear end of each of the first and second prongs 11, 12 may be mounted to a lower portion of the rear frame 25 through screws (not shown). Other suitable tools and/or methods may be used for mounting the first and second prongs 11, 12 to the rear frame 25. In certain embodiments, the rear frame 25 may be perforated and/or recessed to reduce the weight of the compound fork device 10. In some embodiments, two links 26 may be further included in the compound fork device 10. The two links 26 are configured to stabilize the structure of the compound fork device 10. Each of the two links 26 interconnects an upper portion of the rear frame 25 and a respective one of the first and second prongs 11, 12 so as to form a triangular structure with the rear frame 25 and the respective one of the first and second prongs 11, 12. The fastening of the links 26 to the first and second prongs 11, 12 and the rear frame 25 may be performed using, for example, screws (not shown). Other suitable tools and/or methods may be used for the fastening. In some embodiments, the compound fork device 10 may further include a mount 27 mounted at a rear side of the rear frame 25. The mount 27 may be configured to permit the robot 50 (shown in FIGS. 15 and 17) to be coupled to the compound fork device 10. The mount 27 may include a flange 271 disposed thereon, which is configured to attach to the robot 50. In some embodiments, the mount 27 may be perforated and/or recessed to reduce weight thereof.

As shown in FIGS. 4, 5 and 7, in some embodiments, the compound fork device 10 may further include an auxiliary retaining unit 28 that is configured to ensure that the first type container 61 is retained correctly and stably on the first and second prongs 11, 12. The auxiliary retaining unit 28 may include a fluid-actuated cylinder 281, two actuated plates 282, a plurality of actuating rods 283 disposed between the fluid-actuated cylinder 281 and each of the actuated plates 282, and two side frames 284 connected respectively to the actuated plates 282. In some embodiments, the fluid-actuated cylinder 281 may be fastened to the upper portion of the rear frame 25 through, for example, but not limited to, screws (not shown). Other suitable methods and/or tools may be used for fastening the fluid-actuated cylinder 281. In some embodiments, each of the side frames 284 may be located rearwardly of the depressed region 16 of a respective one of the first and second prongs 11, 12 (see also FIG. 10). In certain embodiments, each of the side frames 284 is located above a respective one of the upper guiding units 21. The fluid-actuated cylinder 281 may be a double-acting pneumatic cylinder, a double stroke pneumatic cylinder, or the like. Other suitable devices for serving as the fluid-actuated cylinder 281 are within the contemplated scope of the disclosure. In some embodiments, when the first type container 61 is well-retained to permit the sensors 23 to transmit a signal to the auxiliary retaining unit 28, the fluid-actuated cylinder 281 is triggered to reduce a distance between the fluid-actuated cylinder 281 and each of the actuated plates 282. As such, the side frames 284 are moved toward each other to retain a rear portion of the first type container 61 therebetween. In some embodiments, each of the side frames 284 may be perforated and/or recessed to reduce the weight of the compound fork device 10.

In alternative embodiments, additional features may be added in the compound fork device 10. In yet alternative embodiments, some features in the compound fork device 10 may be modified, replaced, or eliminated without departure from the spirit and scope of the present disclosure.

Figure 15:
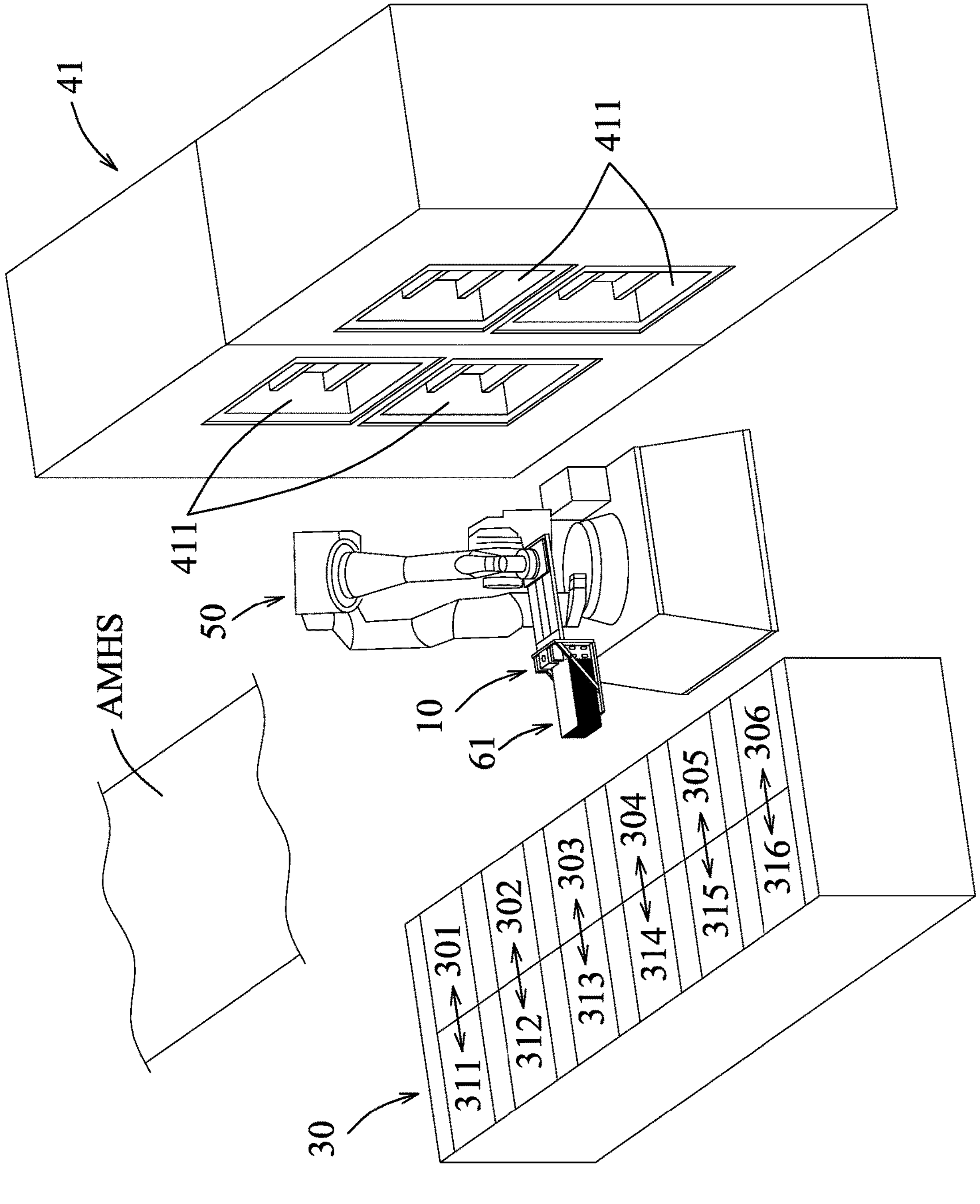
FIG. 15 is a perspective view illustrating the compound fork device in a system being used for transporting the container shown in FIG. 1B in accordance with some embodiments.

FIG. 15 is a perspective view of a system for integrated circuit processes in accordance with some embodiments. The system includes a compound load port stage 30, a processing tool 41, a robot 50, and the compound fork device 10. The compound load port stage 30 is configured to permit loading of the first type container 61 or the second type container 62, 63. The robot 50 is located between the compound load port stage 30 and the processing tool 41. The compound fork device 10 is coupled to be driven by the robot 50, and is configured to selectively retain the first type container 61 or the second type container 62, 63 so as to permit the robot 50 to selectively transport the first type container 61 or the second type container 62, 63 from the compound load port stage 30 to an entry load port 411 of the processing tool 41. In some embodiments, the compound load port stage 30 may include at least one of outer load port locations 311, 312, 313, 314, 315, 316 and at least one of inner load port locations 301, 302, 303, 304, 305, 306, and the compound load port stage 30 may be configured to receive the second type container 62, 63 from an automated material handling system (AMHS) or to permit the second type container 62, 63 to be moved back to the AMHS. Since the examples for the AMHS have been described above, the details thereof are omitted for the sake of brevity.

Figure 16:
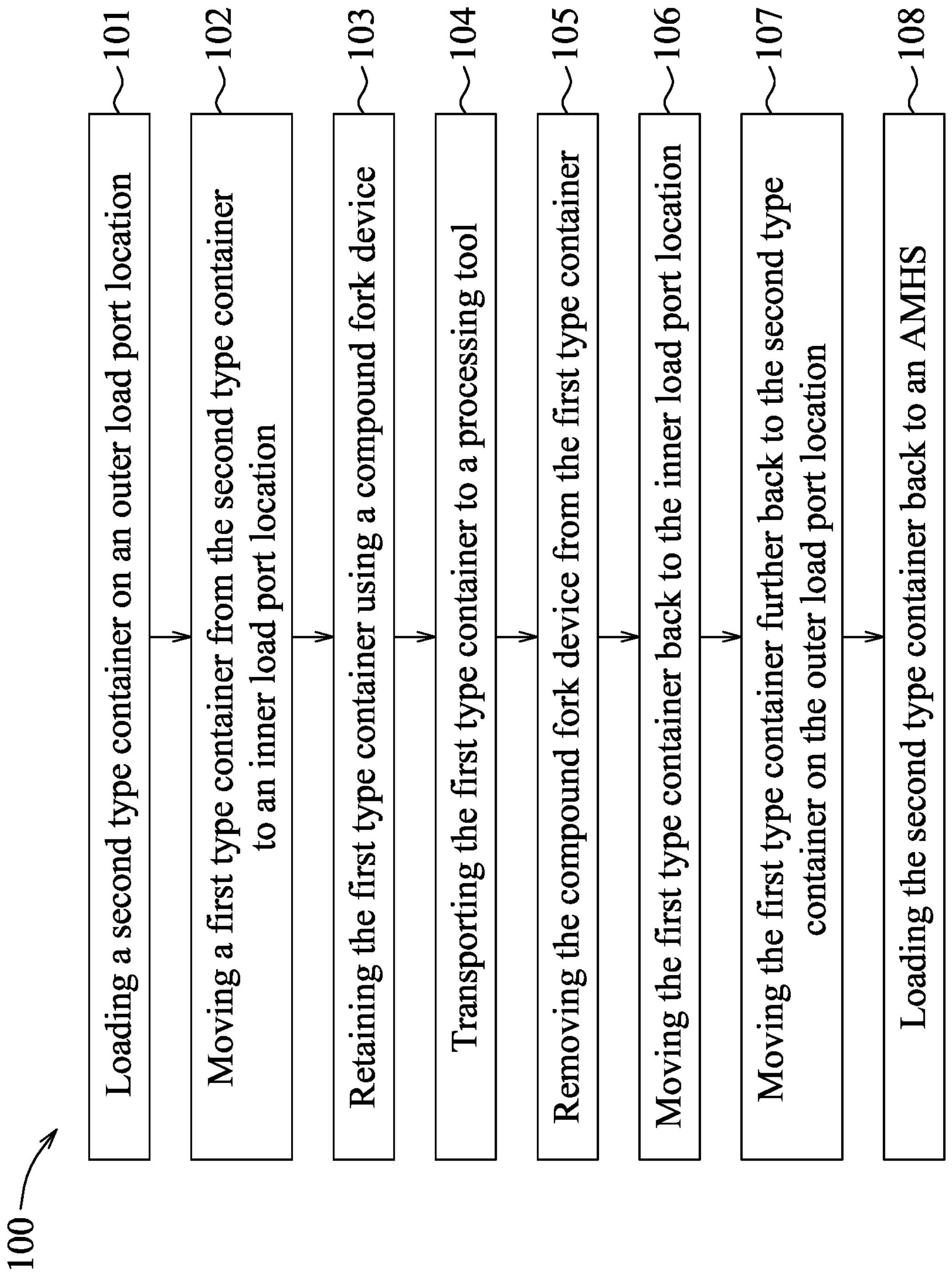
FIG. 16 is a flow diagram illustrating a transporting method for the system shown in FIG. 15 in accordance with some embodiments.

In some embodiments, the processing tool 41 is a heating tool, and the second type container received from the AMHS is a tray cassette type container 62 (see FIG. 2) in which the first type container 61 is accommodated. FIG. 16 is a flow diagram illustrating a transporting method in accordance with some embodiments. When the semiconductor devices inside the first type container 61 as shown in FIG. 1A or 1B are transported to be processed by the processing tool 41, a transporting method 100 shown in FIG. 16 may be used.

Referring to FIGS. 15 and 16, the transporting method 100 may include steps 101 to 108. In step 101, a second type container (for example, but not limited to, a tray cassette type container 62 shown in FIG. 2) unloaded from the AMHS is loaded on a selected one of the outer load port locations 311, 312, 313, 314, 315, 316. In step 102, the first type container 61 (for example, but not limited to, the container shown in FIG. 1A or 1B) detached from the second type container 62 on the selected one of the outer load port locations 311, 312, 313, 314, 315, 316 is moved to a corresponding one of the inner load port locations 301, 302, 303, 304, 305, 306 using an actuating device (not shown). In step 103, the robot 50 is actuated to retain the first type container 61 using the compound fork device 10 until the first type container 61 is well-retained by the compound fork device 10. In step 104, the robot 50 is actuated to transport the first type container 61 to the processing tool 41 until a bottom portion of the first type container 61 is placed on the entry load port 411 of the processing tool 41. In step 105, the compound fork device 10 is removed from the first type container 61. In step 106, after the semiconductor devices inside the first type container 61 are treated for a predetermined time period, the robot 50 is further actuated to move the first type container 61 back to the corresponding one of the inner load port locations 301, 302, 303, 304, 305, 306 using the compound fork device 10. In step 107, the first type container 61 is further moved back to the second type container 62 on the selected one of the outer load port locations 311, 312, 313, 314, 315, 316 using the actuating device. In step 108, the second type container 62 is loaded back to the AMHS.

In alternative embodiments, some steps in the transporting method 100 may be modified, replaced, or eliminated without departure from the spirit and scope of the present disclosure. In yet alternative embodiments, additional steps may be added in the transporting method 100.

In some embodiments, the actuation of the robot 50 may be controlled using a computer device (not shown). To be specific, when a sensor (not shown) detects that the first type container 61 is moved to the corresponding one of the inner load port locations 301, 302, 303, 304, 305, 306, the robot 50 is actuated to permit the first type container 61 to be retained by the compound fork device 10. When the sensors 23 (see FIG. 5) detect that the first type container 61 is well-retained, the robot 50 is actuated to transport the first type container 61 to the processing tool 41. After the predetermined time period, the robot 50 is further actuated to move the first type container 61 back to the corresponding one of the inner load port locations 301, 302, 303, 304, 305, 306 using the compound fork device 10. The computer device may be a programmable logic controller (PLC), or other suitable devices.

In some embodiments, the inner load port locations 301, 302, 303, 304, 305, 306 and the outer load port locations 311, 312, 313, 314, 315, 316 are all within a work envelope of the robot 50. In other embodiments, the outer load port locations 311, 312, 313, 314, 315, 316 may not be in the work envelope of the robot 50. In alternative embodiments, the first type container 61 may be manually removed from the second type container 62, and manually moved back to the second type container 62. The robot 50 may be an articulated robot. In some embodiments, the heating tool 41 may heat the first type container 61 to a temperature that may range from about 100 degrees centigrade (° C.) to 300° C., or may range from about 120° C. to about 180° C., such that the semiconductor devices contained within the first type container 61 may be processed. In some embodiments, the entry load port 411 may be a mobile launch platform.

Figure 17:
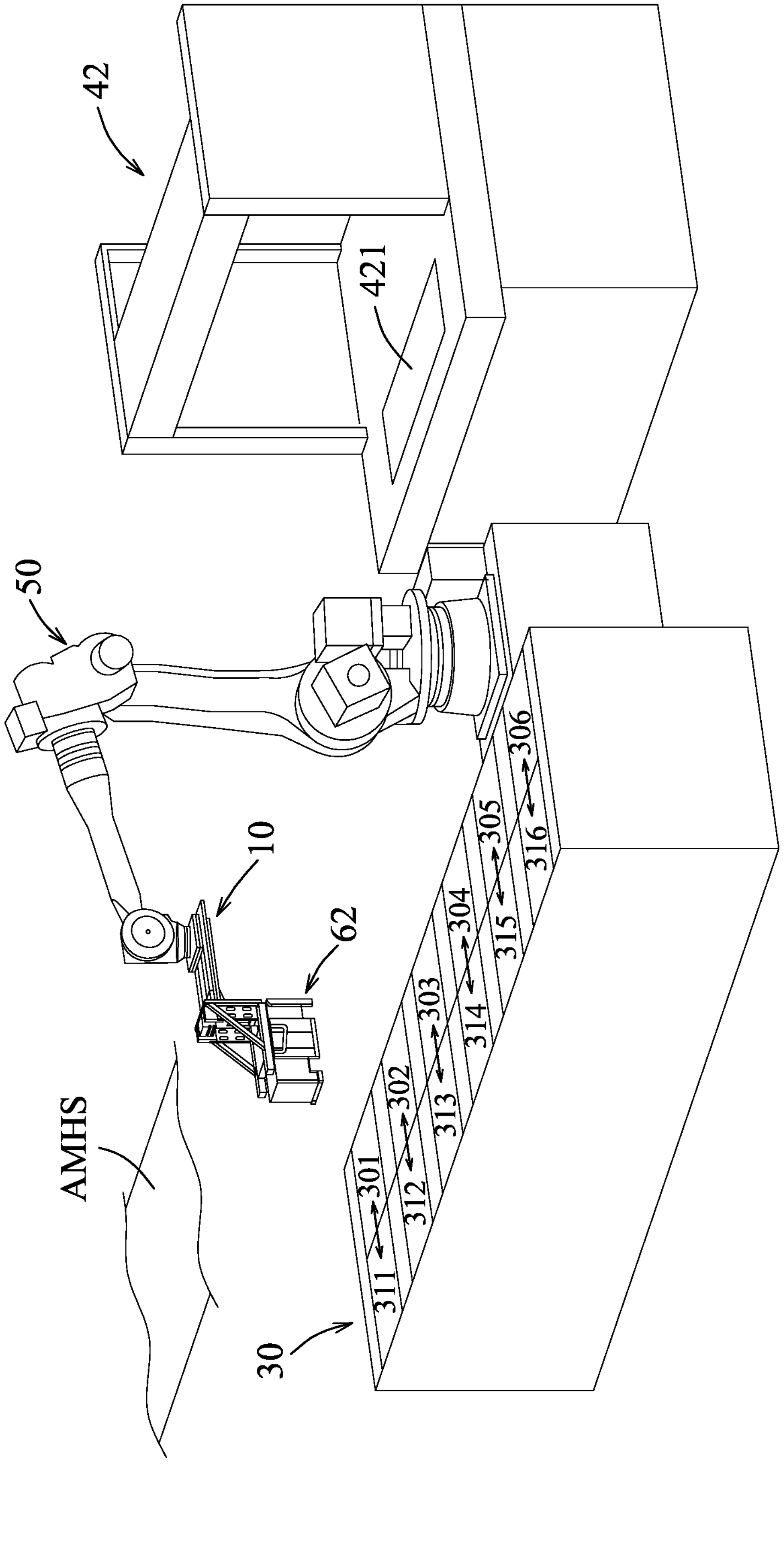
FIG. 17 is a perspective view illustrating the compound fork device in a system being used for transporting the container shown in FIG. 2 in accordance with some embodiments.

FIG. 17 is a perspective view of a system for integrated circuit processes in accordance with some embodiments. The system shown in FIG. 17 is similar to the system shown in FIG. 15, except that in FIG. 17, a processing tool 42 is a non-heating tool, and the system is used for transporting the second type container 62 (see FIG. 2). In some embodiments, the system shown in FIG. 17 may also be used for transporting the second type container 63 shown in FIG. 3A. In some embodiments, the processing tool 42 may be, for example, but not limited to, an inspection tool, and may be other suitable processing tools. In some embodiments, an entry load port 421 of the processing tool 42 may be a mobile launch platform.

Figure 18:
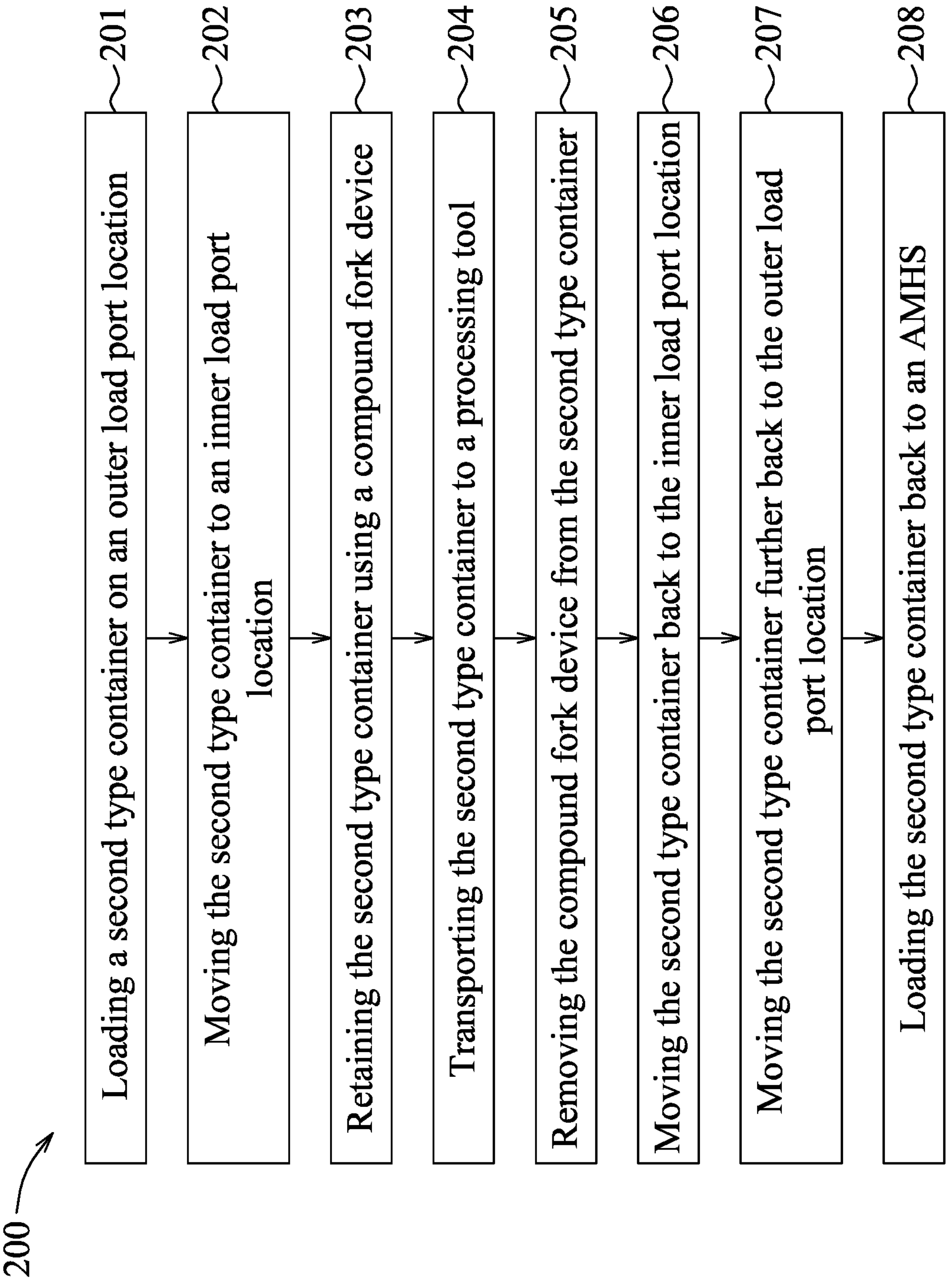
FIG. 18 is a flow diagram illustrating a transporting method for the system shown in FIG. 17 in accordance with some embodiments.

FIG. 18 is a flow diagram illustrating a transporting method in accordance with some embodiments. When the semiconductor devices inside the second type container 62, 63 (see also FIGS. 2 and 3A) are transported to be processed by the processing tool 42, a transporting method 200 shown in FIG. 18 may be used.

Referring to FIGS. 17 and 18, the transporting method 200 may include steps 201 to 208. In step 201, the second type container (for example, but not limited to, a tray cassette type container 62 shown in FIG. 2, a magazine type container 63 shown in FIG. 3A, or any other containers with top flanges) unloaded from the AMHS is loaded on a selected one of the outer load port locations 311, 312, 313, 314, 315, 316. In step 202, the second type container 62, 63 on the selected one of the outer load port locations 311, 312, 313, 314, 315, 316 is moved to a corresponding one of the inner load port locations 301, 302, 303, 304, 305, 306 using an actuating device (not shown). In step 203, the robot 50 is actuated to retain the second type container 62, 63 using the compound fork device 10 until the second type container 62, 63 is well-retained by the compound fork device 10. In step 204, the robot 50 is actuated to transport the second type container 62, 63 to the processing tool 42 until a bottom portion of the second type container 62, 63 is placed on the entry load port 421 of the processing tool 42. Please note that although the container shown in FIG. 17 is the container 62, the container 63 shown in FIG. 3A or any other containers with top flanges may be used in the method 200. In step 205, the compound fork device 10 is removed from the second type container 62, 63. In step 206, after the semiconductor devices inside the second type container 62, 63 are processed and/or inspected using the processing tool 42, the robot 50 is further actuated to move the second type container 62, 63 back to the corresponding one of the inner load port locations 301, 302, 303, 304, 305, 306 using the compound fork device 10. In step 207, the second type container 62, 63 is further moved back to the selected one of the outer load port locations 311, 312, 313, 314, 315, 316 using the actuating device. In step 208, the second type container 62, 63 is loaded back to the AMHS.

In alternative embodiments, some steps in the transporting method 200 may be modified, replaced, or eliminated without departure from the spirit and scope of the present disclosure. In yet alternative embodiments, additional steps may be added in the transporting method 200.

The compound fork device 10 of the present disclosure may be used in the processes for manufacturing various products, such as, but not limited to, InFO (Integrated Fan-out), CoWoS (Chip-on-Wafer-on-Substrate), SOIC (System-on-Integrated-Chips), future bumping/packaging products, or other suitable products.

The embodiments of the present disclosure have following advantageous features. By forming an upper surface and a lower surface on each of the first and second prongs of the compound fork device, the compound fork device can carry and deliver multiple different containers, which increases efficiency of the transporting process during a semiconductor manufacturing process without having to utilize various carrier devices corresponding to the different containers. In addition, by adding the upper and lower guiding units, the sensors, and the positioning units to the compound fork device, positioning of the containers retained on the first and second prongs can be ensured to be even and stable such that tilting of the containers, which may damage the contained products or semiconductor devices inside the containers, can be avoided. Moreover, by including an auxiliary retaining unit in the compound fork device, stability of the transporting process may be further increased.

In accordance with some embodiments of the present disclosure, a compound fork device includes a first prong and a second prong spaced apart from the first prong. Each of the first and second prongs has an upper surface and a lower surface which is depressed relative to the upper surface. The upper surfaces of the first and second prongs are configured to cooperatively retain a first type container. The lower surfaces of the first and second prongs are configured to cooperatively retain a second type container having a configuration different from that of the first type container.

In accordance with some embodiments of the present disclosure, a height difference between the upper surface and the lower surface of each of the first and second prongs is in a range from 1 mm to 5 cm.

In accordance with some embodiments of the present disclosure, the upper surface of each of the first and second prongs includes a front supporting region located forwardly of the lower surface, and a rear supporting region located rearwardly of the lower surface so as to permit four portions of the first type container to be respectively retained by the front and rear supporting regions of the upper surfaces of the first and second prongs.

In accordance with some embodiments of the present disclosure, the upper surface of each of the first and second prongs has a front mounting region located outwardly of the front supporting region, and a rear mounting region located outwardly of the rear supporting region. The lower surface of each of the first and second prongs has an inner supporting region and an outer mounting region located outwardly of the inner supporting region. The inner supporting regions of the first and second prongs are located to cooperatively retain a top flange of the second type container.

In accordance with some embodiments of the present disclosure, the compound fork device further includes two upper guiding units and two lower guiding units. The two upper guiding units are respectively formed on the upper surfaces of the first and second prongs to guide two sides of the first type container so as to permit the four portions of the first type container to be respectively moved onto the front and rear supporting regions of the upper surfaces of the first and second prongs. The two lower guiding units are respectively formed on the outer mounting regions of the first and second prongs so as to guide two sides of the top flange of the second type container to respectively move onto the inner supporting regions of the first and second prongs.

In accordance with some embodiments of the present disclosure, the first and second prongs are symmetrical to each other. The upper guiding units disposed respectively on the first and second prongs are symmetrical to each other. The lower guiding units disposed respectively on the first and second prongs are symmetrical to each other.

In accordance with some embodiments of the present disclosure, each of the upper guiding units includes two upper guide blocks which are respectively disposed on the front and rear mounting regions of a respective one of the first and second prongs. Each of the upper guide blocks has an upper guiding surface. The upper guiding surfaces of the upper guide blocks of one of the upper guiding units are disposed to confront the upper guiding surfaces of the upper guide blocks of the other one of the upper guiding units. Each of the lower guiding units includes two lower guide blocks which are spaced apart from each other and which are disposed on the outer mounting region of a respective one of the first and second prongs. Each of the lower guide blocks has a lower guiding surface. The lower guiding surfaces of the lower guide blocks of one of the lower guiding units are disposed to confront the lower guiding surfaces of the lower guide blocks of the other one of the lower guiding units.

In accordance with some embodiments of the present disclosure, an included angle between the upper guiding surface and the upper surface of a corresponding one of the first and second prongs is not less than 45° and is less than 90°, and an included angle between the lower guiding surface and the lower surface of a corresponding one of the first and second prongs is not less than 45° and is less than 90°.

In accordance with some embodiments of the present disclosure, each of the upper guide blocks further has an upper flat surface extending downwardly from the upper guiding surface to the upper surface of a corresponding one of the first and second prongs such that the upper flat surface is arranged perpendicular to the upper surface of the corresponding one of the first and second prongs. Each of the lower guide blocks further has a lower flat surface extending downwardly from the lower guiding surface to the lower surface of a corresponding one of the first and second prongs such that the lower flat surface is arranged perpendicular to the lower surface of the corresponding one of the first and second prongs.

In accordance with some embodiments of the present disclosure, the compound fork device further includes two sensors. One of the two sensors is disposed forwardly of the upper guide blocks of one of the upper guiding units, and the other one of the two sensors is disposed rearwardly of the upper guide blocks of the other one of the upper guiding units.

In accordance with some embodiments of the present disclosure, the compound fork device further includes two positioning units which are mounted on the lower surfaces of the first and second prongs, respectively, and which are configured to position the top flange when being retained by the lower surfaces of the first and second prongs.

In accordance with some embodiments of the present disclosure, each of the positioning units includes two main positioning pins. One of the two main positioning pins is located forwardly of the lower guide blocks of a respective one of the lower guiding units, and the other one of the two main positioning pins is located rearwardly of the lower guide blocks of the respective one of the lower guiding units such that when the two sides of the top flange are respectively moved onto the inner supporting regions of the first and second prongs, the main positioning pins of the positioning units are respectively located outwardly of four edges of the top flange, thereby positioning the top flange.

In accordance with some embodiments of the present disclosure, each of the positioning units further includes an auxiliary positioning pin which is located between the lower guide blocks of a respective one of the lower guiding units, and which is configured to engage with a respective one of the two sides of the top flange when the two sides of the top flange are respectively moved onto the inner supporting regions of the first and second prongs.

In accordance with some embodiments of the present disclosure, a system includes a compound load port stage, a processing tool, a robot, and a compound fork device. The compound load port stage is configured to permit loading of a first type container or a second type container having a configuration different from that of the first type container. The robot is located between the compound load port stage and the processing tool. The compound fork device is coupled to be driven by the robot, and is configured to selectively retain the first type container or the second type container so as to permit the robot to selectively transport the first or second type container from the compound load port stage to an entry load port of the processing tool. The compound fork device includes a first prong and a second prong spaced apart from the first prong. Each of the first and second prongs has an upper surface and a lower surface which is depressed relative to the upper surface. The upper surfaces of the first and second prongs are configured to cooperatively retain the first type container. The lower surfaces of the first and second prongs are configured to cooperatively retain the second type container.

In accordance with some embodiments of the present disclosure, the compound fork device further includes a rear frame. A rear end of each of the first and second prongs is mounted to a lower portion of the rear frame.

In accordance with some embodiments of the present disclosure, the compound fork device further includes two links, each of which interconnects an upper portion of the rear frame and a respective one of the first and second prongs.

In accordance with some embodiments of the present disclosure, the compound fork device further includes a mount mounted at a rear side of the rear frame, and is configured to permit the robot to be coupled to the compound fork device through the mount.

In accordance with some embodiments of the present disclosure, a method includes: placing a container on a compound load port stage; retaining the container using a compound fork device which includes a first prong and a second prong, each of the first and second prongs having an upper surface and a lower surface depressed relative to the upper surface such that the container is retained by the upper surfaces or the lower surfaces of the first and second prongs; transporting the container to a processing tool using the compound fork device such that a bottom portion of the container is placed on an entry load port of the processing tool; and removing the compound fork device from the container.

In accordance with some embodiments of the present disclosure, two sides of the container are retained by the upper surfaces of the first and second prongs.

In accordance with some embodiments of the present disclosure, two sides of a top flange of the container are retained by the lower surfaces of the first and second prongs.

The foregoing outlines features of several embodiments so that those skilled in the art may better understand the aspects of the present disclosure. Those skilled in the art should appreciate that they may readily use the present disclosure as a basis for designing or modifying other processes or structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A compound fork device comprising:

a first prong and a second prong spaced apart from the first prong, each of the first prong and the second prong having an upper surface and a lower surface which is depressed relative to the upper surface, the upper surface of the first prong and the upper surface of the second prong being configured to cooperatively retain a first type container, the lower surface of the first prong and the lower surface of the second prong being configured to cooperatively retain a second type container having a configuration different from a configuration of the first type container;

wherein the upper surface of each of the first prong and the second prong includes a front supporting region located forwardly of the lower surface, and a rear supporting region located rearwardly of the lower surface so as to permit four portions of the first type container to be respectively retained by the front supporting region and the rear supporting region of the first prong and the front supporting region and the rear supporting region of the second prong;

wherein the lower surface of each of the first prong and the second prong has an inner supporting region and an outer mounting region located outwardly of the inner supporting region, the inner supporting region of the first prong and the inner supporting region of the second prong being located to cooperatively retain a top flange of the second type container;

wherein the compound fork device further comprises two upper guiding units which are respectively formed on the upper surface of the first prong and the upper surface of the second prong to guide two sides of the first type container so as to permit the four portions of the first type container to be respectively moved onto the front supporting region and the rear supporting region of the first prong and the front supporting region and the rear supporting region of the second prong;

wherein the compound fork device further comprises two lower guiding units which are respectively formed on the outer mounting region of the first prong and the outer mounting region of the second prong so as to guide two sides of the top flange of the second type container to respectively move onto the inner supporting region of the first prong and the inner supporting region of the second prong;

wherein one of the two upper guiding units on the first prong is spaced apart from one of the two lower guiding units on the first prong, and another one of the two upper guiding units on the second prong is spaced apart from another one of the two lower guiding units on the second prong; and wherein each of the two lower guiding units includes two lower guide blocks which are spaced apart from each other and which are disposed on the outer mounting region of a respective one of the first prong and the second prong, the two lower guide blocks respectively having two lower guiding surfaces, the two lower guiding surfaces of the two lower guide blocks of one of the two lower guiding units being disposed to confront the two lower guiding surfaces of the two lower guide blocks of another one of the two lower guiding units.

2. The compound fork device of claim 1, wherein a height difference between the upper surface and the lower surface of each of the first prong and the second prong is in a range from 1 mm to 5 cm.

3. The compound fork device of claim 1, wherein the upper surface of each of the first prong and the second prong has a front mounting region located outwardly of the front supporting region, and a rear mounting region located outwardly of the rear supporting region.

4. The compound fork device of claim 3, wherein each of the two upper guiding units includes two upper guide blocks which are respectively disposed on the front mounting region and the rear mounting region of a respective one of the first prong and the second prong, the two upper guide blocks respectively having two upper guiding surfaces, the two upper guiding surfaces of the two upper guide blocks of one of the two upper guiding units being disposed to confront the two upper guiding surfaces of the two upper guide blocks of another one of the two upper guiding units.

5. The compound fork device of claim 4, wherein one of the two upper guiding surfaces forms an included angle with the upper surface of a corresponding one of the first prong and the second prong, and the first included angle is not less than 45° and is less than 90°.

6. The compound fork device of claim 4, wherein each of the two upper guide blocks further has an upper flat surface extending downwardly from one of the two upper guiding surfaces to the upper surface of a corresponding one of the first prong and the second prong such that the upper flat surface is arranged perpendicular to the upper surface of the corresponding one of the first prong and the second prong.

7. The compound fork device of claim 4, further comprising two sensors, one of the two sensors being disposed forwardly of the two upper guide blocks of one of the two upper guiding units, and another one of the two sensors being disposed rearwardly of the two upper guide blocks of another one of the two upper guiding units.

8. The compound fork device of claim 1, wherein the first prong and the second prong are symmetrical to each other, the two upper guiding units disposed respectively on the first prong and the second prong are symmetrical to each other, and the two lower guiding units disposed respectively on the first prong and second prong are symmetrical to each other.

9. The compound fork device of claim 1, wherein one of the two lower guiding surfaces forms an included angle with the lower surface of a corresponding one of the first prong and the second prong, and the included angle is not less than 45° and is less than 90°.

10. The compound fork device of claim 1, wherein each of the two lower guide blocks further has a lower flat surface extending downwardly from one of the two lower guiding surfaces to the lower surface of a corresponding one of the first prong and the second prong such that the lower flat surface is arranged perpendicular to the lower surface of the corresponding one of the first prong and the second prong.

11. The compound fork device of claim 1, further comprising two positioning units which are mounted on the lower surface of the first prong and the lower surface of the second prong, respectively, and which are configured to position the top flange when being retained by the lower surface of the first prong and the lower surface of the second prong.

12. The compound fork device of claim 11, wherein each of the two positioning units includes two main positioning pins, one of the two main positioning pins being located forwardly of the two lower guide blocks of a respective one of the two lower guiding units, another one of the two main positioning pins being located rearwardly of the two lower guide blocks of the respective one of the two lower guiding units such that when the two sides of the top flange are respectively moved onto the inner supporting region of the first prong and the inner supporting region of the second prong, the two main positioning pins of one of the two positioning units and the two main positioning pins of another one of the two positioning units are respectively located outwardly of four edges of the top flange, thereby positioning the top flange; and each of the two positioning units further includes an auxiliary positioning pin which is located between the two lower guide blocks of a respective one of the two lower guiding units, and which is configured to engage with a respective one of the two sides of the top flange when the two sides of the top flange are respectively moved onto the inner supporting region of the first prong and the inner supporting region of the second prong.

13. A system comprising:

a compound load port stage configured to permit loading of a first type container or a second type container having a configuration different from a configuration of the first type container;

a processing tool;

a robot located between the compound load port stage and the processing tool; and a compound fork device coupled to be driven by the robot, and configured to selectively retain the first type container or the second type container so as to permit the robot to selectively transport the first type container or the second type container from the compound load port stage to an entry load port of the processing tool, the compound fork device including a first prong and a second prong spaced apart from the first prong, each of the first prong and the second prong having an upper surface and a lower surface which is depressed relative to the upper surface, the upper surface of the first prong and the upper surface of the second prong being configured to cooperatively retain the first type container, the lower surface of the first prong and the lower surface of the second prong being configured to cooperatively retain the second type container, wherein the compound fork device further includes a rear frame, a rear end of each of the first prong and the second prong being mounted to a lower portion of the rear frame; and wherein the compound fork device further includes two links, each of which interconnects an upper portion of the rear frame and a respective one of the first prong and the second prong.

14. The system of claim 13, wherein the compound fork device further includes a mount mounted at a rear side of the rear frame, and configured to permit the robot to be coupled to the compound fork device through the mount.

15. A compound fork device comprising:

a first prong and a second prong spaced apart from the first prong, each of the first prong and the second prong having an upper surface and a lower surface which is depressed relative to the upper surface, the upper surface of the first prong and the upper surface of the second prong being configured to cooperatively retain a first type container, the lower surface of the first prong and the lower surface of the second prong being configured to cooperatively retain a second type container having a configuration different from a configuration of the first type container;

wherein the upper surface of each of the first prong and the second prong includes a front supporting region located forwardly of the lower surface, and a rear supporting region located rearwardly of the lower surface so as to permit four portions of the first type container to be respectively retained by the front supporting region and the rear supporting region of the first prong and the front supporting region and the rear supporting region of the second prong;

wherein the upper surface of each of the first prong and the second prong has a front mounting region located outwardly of the front supporting region, and a rear mounting region located outwardly of the rear supporting region;

wherein the lower surface of each of the first prong and the second prong has an inner supporting region and an outer mounting region located outwardly of the inner supporting region, the inner supporting region of the first prong and the inner supporting region of the second prong being located to cooperatively retain a top flange of the second type container;

wherein the compound fork device further comprises two upper guiding units which are respectively formed on the upper surface of the first prong and the upper surface of the second prong to guide two sides of the first type container so as to permit the four portions of the first type container to be respectively moved onto the front supporting region and the rear supporting region of the first prong and the front supporting region and the rear supporting region of the second prong;

wherein the compound fork device further comprises two lower guiding units which are respectively formed on the outer mounting region of the first prong and the outer mounting region of the second prong so as to guide two sides of the top flange of the second type container to respectively move onto the inner supporting region of the first prong and the inner supporting region of the second prong;

wherein each of the two upper guiding units includes two upper guide blocks which are respectively disposed on the front mounting region and the rear mounting region of a respective one of the first prong and the second prong, the two upper guide blocks respectively having two upper guiding surfaces, the two upper guiding surfaces of the two upper guide blocks of one of the two upper guiding units being disposed to confront the two upper guiding surfaces of the two upper guide blocks of another one of the two upper guiding units; and wherein each of the two lower guiding units includes two lower guide blocks which are spaced apart from each other and which are disposed on the outer mounting region of a respective one of the first prong and the second prong, the two lower guide blocks respectively having two lower guiding surfaces, the two lower guiding surfaces of the two lower guide blocks of one of the two lower guiding units being disposed to confront the two lower guiding surfaces of the two lower guide blocks of another one of the two lower guiding units.

16. The compound fork device of claim 15, wherein one of the two upper guiding surfaces forms a first included angle with the upper surface of a corresponding one of the first prong and the second prong, and the first included angle is not less than 45° and is less than 90°, and one of the two lower guiding surfaces forms a second included angle with the lower surface of a corresponding one of the first prong and the second prong, and the second included angle is not less than 45° and is less than 90°.

17. The compound fork device of claim 15, wherein each of the two upper guide blocks further has an upper flat surface extending downwardly from one of the two upper guiding surfaces to the upper surface of a corresponding one of the first prong and the second prong such that the upper flat surface is arranged perpendicular to the upper surface of the corresponding one of the first prong and the second prong; and each of the two lower guide blocks further has a lower flat surface extending downwardly from one of the lower guiding surfaces to the lower surface of a corresponding one of the first prong and the second prong such that the lower flat surface is arranged perpendicular to the lower surface of the corresponding one of the first prong and the second prong.

18. The compound fork device of claim 15, further comprising two sensors, one of the two sensors being disposed forwardly of the two upper guide blocks of one of the two upper guiding units, and another one of the two sensors being disposed rearwardly of the two upper guide blocks of another one of the two upper guiding units.

19. The compound fork device of claim 15, further comprising two front main positioning pins and two rear main positioning pins, each of the two front main positioning pins being located forwardly of the two lower guide blocks of a respective one of the two lower guiding units and on the lower surface of a respective one of the first prong and the second prong, each of the two rear main positioning pins being located rearwardly of the two lower guide blocks of a respective one of the two lower guiding units and on the lower surface of a respective one of the first prong and the second prong such that when the two sides of the top flange are respectively moved onto the inner supporting region of the first prong and the inner supporting region of the second prong, the two front main positioning pins and the two rear main positioning pins are respectively located outwardly of four edges of the top flange, thereby positioning the top flange; and two auxiliary positioning pins each of which is located between the two lower guide blocks of a respective one of the two lower guiding units, and each of which is configured to engage with a respective one of the two sides of the top flange when the two sides of the top flange are respectively moved onto the inner supporting region of the first prong and the inner supporting region of the second prong.

20. The compound fork device of claim 15, wherein for each of the two lower guiding units, each of the two lower guide blocks has a block height in a direction normal to the lower surface of a corresponding one of the first prong and the second prong, the block height being not greater than a height difference between the upper surface and the lower surface of the corresponding one of the first prong and the second prong.

* * * * *